US011987413B2

(12) United States Patent
Magri et al.

(10) Patent No.: US 11,987,413 B2
(45) Date of Patent: May 21, 2024

(54) CARTONING APPARATUS

(71) Applicant: A.C.M.I.—SOCIETA' PER AZIONI, Fornovo di Taro (IT)

(72) Inventors: Giacomo Magri, Corniglio (IT); Carlo Gioria, Felino (IT); Domenico Buemi, Casalmaggiore (IT)

(73) Assignee: A.C.M.I.—SOCIETA' PER AZIONI, Fornovo di Taro (IT)

( * ) Notice: Subject to any disclaimer, the term of this patent is extended or adjusted under 35 U.S.C. 154(b) by 256 days.

(21) Appl. No.: 17/540,890

(22) Filed: Dec. 2, 2021

(65) Prior Publication Data

US 2022/0176668 A1 Jun. 9, 2022

(30) Foreign Application Priority Data

Dec. 7, 2020 (IT) ........................ 102020000030092

(51) Int. Cl.

*B65B 43/18* (2006.01)
*B31B 50/80* (2017.01)
*B31B 100/00* (2017.01)
*B65B 43/30* (2006.01)

(52) U.S. Cl.

CPC ............ *B65B 43/185* (2013.01); *B31B 50/80* (2017.08); *B65B 43/305* (2013.01); *B31B 2100/00* (2017.08)

(58) Field of Classification Search

CPC ..... B31B 50/142; B31B 50/80; B31B 50/802; B31B 50/804; B31B 2100/00; B25J 15/0028; B25J 15/0683; B65B 43/305; B65B 43/265; B65B 43/185

See application file for complete search history.

(56) References Cited

U.S. PATENT DOCUMENTS

| | | | | |
|---|---|---|---|---|
| 7,788,881 | B2 * | 9/2010 | Johnson | B65B 43/265 493/309 |
| 9,993,845 | B1 * | 6/2018 | Power | B07C 3/008 |
| 10,273,042 | B1 * | 4/2019 | Kolodziey | B31B 50/003 |
| 11,505,341 | B1 * | 11/2022 | Danner, Jr. | B65B 7/20 |
| 2004/0110619 | A1 * | 6/2004 | Frank | B31B 50/802 493/309 |
| 2010/0068012 | A1 | 3/2010 | Petijean | |

(Continued)

FOREIGN PATENT DOCUMENTS

| | | | |
|---|---|---|---|
| BR | 102018009933 | A2 | 11/2019 |
| CN | 109552704 | A | 4/2019 |

(Continued)

*Primary Examiner* — Joshua G Kotis
*Assistant Examiner* — Scott A Howell
(74) *Attorney, Agent, or Firm* — Browdy and Neimark, PLLC

(57) ABSTRACT

The invention relates to a cartoning apparatus (1) of items comprising: a die-cut magazine (125), in which a plurality of die-cuts (5) are stored for packaging the items, and a die-cut (170) pick-up and manipulating machine, configured to pick up the die-cuts (5) from the die-cut (125) magazine and manipulate them so as to open each die-cut (5). Where the die-cut (170) pick-up and manipulating machine comprises a robotic arm (180) on which a die-cut (175) gripping and manipulating module is installed, configured to grip one die-cut (5) at a time directly from the pick-up area (135) of the die-cut (125) magazine and manipulate it in order to open it.

3 Claims, 20 Drawing Sheets

(56) References Cited

U.S. PATENT DOCUMENTS

| | | | | |
|---|---|---|---|---|
| 2011/0030318 | A1* | 2/2011 | Moylan | B65B 5/04 53/458 |
| 2014/0179501 | A1* | 6/2014 | Akama | B31B 50/262 493/162 |
| 2016/0229571 | A1* | 8/2016 | Hansen | B31B 50/07 |
| 2018/0267690 | A1* | 9/2018 | Kemp | B25J 5/007 |
| 2019/0184671 | A1* | 6/2019 | Yokota | B31B 50/802 |
| 2021/0291378 | A1* | 9/2021 | Komoda | B25J 13/088 |
| 2022/0161445 | A1* | 5/2022 | Larouche | B25J 15/0683 |
| 2022/0258894 | A1* | 8/2022 | Langen | B65B 43/126 |

FOREIGN PATENT DOCUMENTS

| | | | |
|---|---|---|---|
| DE | 102017200507 | A1 * | 7/2018 |
| DE | 102017200507 | A1 | 7/2018 |
| WO | 2011012791 | A1 | 2/2011 |
| WO | 2020042667 | A1 | 3/2020 |

* cited by examiner

CARTONING APPARATUS

TECHNICAL FIELD

The present invention relates to a cartoning apparatus for the insertion into cartons, made starting from die-cuts, of respective sorted clusters of items, such as for example sorted clusters of cans or bottles. More in detail, the cartoning apparatus is configured to use American-type cartons, or pre-glued die-cuts which, once opened, form a tubular body with a rectangular section.

PRIOR ART

Cartoning apparatuses are known which from an incoming flow of loose items, such as cans or bottles, output closed boxes, generally made of cardboard or of a material based on wood fibres, inside each of which there is a sorted cluster of items made up of a predetermined number of items.

In particular, the clusters are sorted in such a way that each of them has a predetermined number of rows and columns perpendicular to each other.

The cartoning apparatuses comprise a die-cut magazine, which contains the die-cuts that following an appropriate manipulation take the shape of the boxes. This magazine is generally provided with a transport arrangement, configured to move the die-cuts towards a die-cuts pick-up area, where a die-cut pick-up and manipulating machine picks up the outermost die-cuts one by one in the pick-up area and manipulates them so as to give each picked up die-cut the shape of a box.

Known pick-up and manipulating machines, also commonly known by the names of unscrambling machines or carton opening machines, usually comprise suction cups adapted to seize the die-cuts and which are moved by mechanisms with a rotating cam and/or eccentric shaft such as those illustrated in U.S. Pat. No. 5,249,916 and in U.S. Pat. No. 5,456,570, to extract the die-cuts from the respective magazine and to manipulate them to form a box, that is, in jargon, to unscramble them or open them.

These mechanisms also allow to position the formed or semi-formed box directly on a conveyor which crosses a product insertion area and a box closing area.

A problem with these mechanisms is that they do not lend themselves to variations in the size or type of die-cut, thus reducing the field of application of the apparatus.

It is an object of the present invention to solve said drawback of the known art within the scope of a simple, rational and affordable solution.

Such object is achieved by the features of the invention indicated in the independent claim. The dependent claims outline preferred and/or particularly advantageous aspects of the invention.

DISCLOSURE OF THE INVENTION

The invention makes available an item cartoning apparatus comprising:

- a die-cut magazine, in which die-cuts are stored for packaging the items,
- a die-cut pick-up and manipulating machine, configured to pick up the die-cuts from the die-cut magazine and manipulate them so as to open each die-cut, wherein the die-cut pick-up and manipulating machine comprises a robotic arm on which a die-cut gripping and manipulating module is installed, configured to grip one die-cut at a time directly from the pick-up area of the die-cut magazine and manipulate it in order to open it.

Thanks to this solution, the apparatus is more versatile than the prior art apparatuses, as being able to move the gripping and manipulating mechanism with a robotic arm, it is possible to adapt the same gripping and manipulating module to a wide range of different die-cuts, without the need to mechanically modify the layout of the gripping and manipulating module. Furthermore, the robotic arm allows picking up die-cuts with any inclination (vertical, horizontal, oblique) and forming boxes to be positioned both with horizontal opening (like the embodiment illustrated in the figures) and with vertical opening.

It should be emphasized that the die-cut is opened only thanks to the gripping and manipulating module, and that this gripping and manipulating module is all installed on the robotic arm.

For example, the robotic arm comprises a fixed base and a kinematic chain provided with a plurality of rigid members connected by joints, of which a first rigid member of the kinematic chain, which is fixed to the base, and a last rigid member to which the gripping and manipulating module is connected.

In the preferred embodiment illustrated, the robotic arm is of the six-axis type.

This solution allows a very high flexibility in the use of the robotic arm, with regard to variations in the type of die-cut and also in the position or type of magazine of the die-cuts.

According to an aspect of the invention, the gripping and manipulating module can comprise a first suction cup, a second suction cup, and an articulated mechanism configured to move the second suction cup with respect to the first suction cup in at least one position in which the second suction cup faces the first suction cup and the die-cut is retained at a first face thereof by the first suction cup and at a second face opposite to the first by the second suction cup.

Thanks to this solution it is possible to carry out a positive opening of the die-cut, an operation commonly known by the name of positive unscrambling, where two opposite portions of the die-cut are pulled in opposite directions and which presents fewer rejects than the negative opening, in which a portion of a die-cut is pushed with respect to an adjacent portion.

According to another aspect of the invention, the articulated mechanism can comprise:

- a support frame, to which the first suction cup is associated,
- a first rigid element, hinged to the support frame with respect to a first hinge axis,
- a second rigid element, hinged to the support frame with respect to a second hinge axis parallel and eccentric with respect to the first hinge axis,
- a third rigid element, hinged to the first rigid element with respect to a third hinge axis parallel and eccentric to the first hinge axis and to the second hinge axis, and to the second rigid element with respect to a fourth hinge axis parallel and eccentric to the first axis hinge, to the second hinge axis and to the third hinge axis,
- a fourth rigid element, which is hinged to the first rigid element with respect to a fifth hinge axis parallel and eccentric to the first hinge axis, to the second hinge axis, to the third hinge axis and to the fourth hinge axis, and which is hinged also to the second rigid element, with respect to a sixth hinge axis parallel and eccentric to all the other hinge axes of the mechanism, a fifth rigid element, hinged to the third rigid element and to the fourth rigid element respectively with respect to a seventh hinge axis and an eighth hinge axis, parallel and eccentric with respect to all the other hinge axes of the articulated mechanism.

In this module, the articulated mechanism is particularly effective and more compact, for example a mechanism provided with a first bar to which the first suction cup is fixed and a second bar hinged directly to the first and to which the second suction cup is fixed.

According to yet another aspect of the invention, the apparatus can comprise a machine for inserting the clusters of items into the open die-cuts and for closing the open die-cuts, which is provided with a transport arrangement for the open die-cuts configured to move said die-cuts along a plurality of stations of the machine, and wherein the robotic arm is configured to position the open die-cuts on the transport arrangement of the machine for inserting the clusters of items into the open die-cuts and for closing the open die-cuts.

According to a further aspect of the invention, the apparatus can comprise a sorting machine, which is configured to arrange the items into clusters, and in which the die-cut magazine is flanked in plan to the sorting machine and a direction of movement of the die-cuts along the magazine is transverse to a direction of movement of the items along the sorting machine.

Furthermore, the invention can provide that the machine for inserting the clusters of items into the open die-cuts and for closing the open die-cuts comprises a pusher drive configured to push one cluster of items at a time inside an open die-cut present on the transport arrangement of the machine.

BRIEF DESCRIPTION OF THE DRAWINGS

Further characteristics and advantages of the invention will become clear from reading the following description provided by way of non-limiting example, with the aid of the figures illustrated in the accompanying tables.

BEST MODE OF THE INVENTION

With particular reference to these figures, 1 generally indicates a cartoning apparatus, hereinafter abbreviated as apparatus 1, configured to package clusters of items, for example bottles or cans, inside boxes.

These boxes are made starting from die-cuts 5, in particular the apparatus of the invention employs die-cuts commonly known as American boxes. In other words, they are die-cuts pre-glued in some points.

Figure 20:
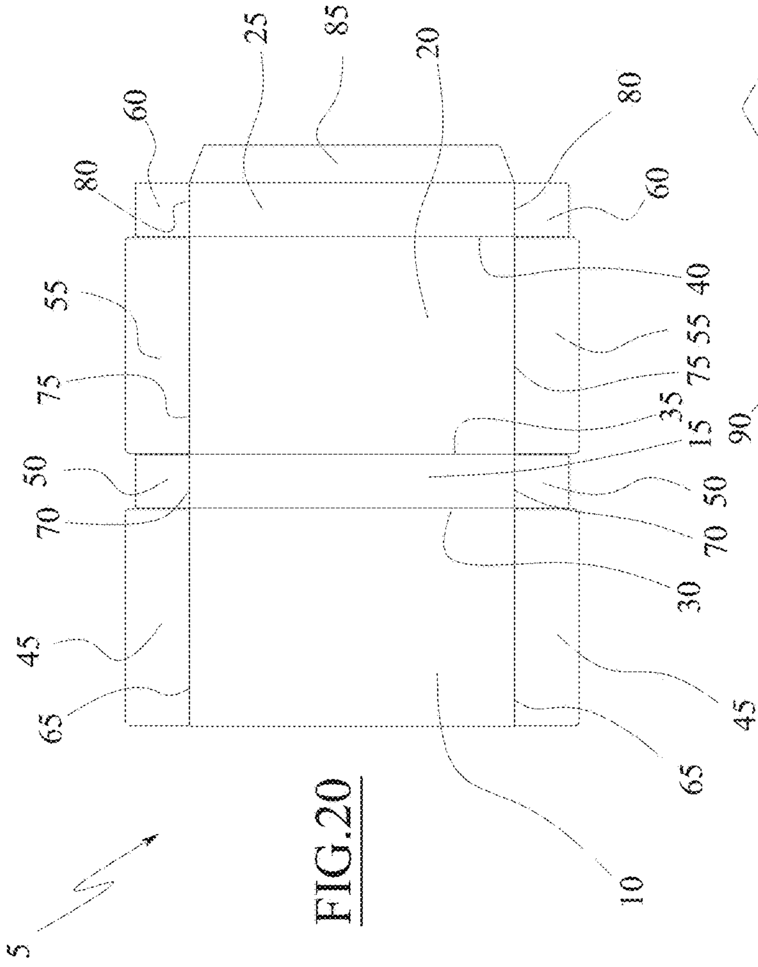
FIG. 20 is an orthogonal view of the type of die-cut that is used by the apparatus subject-matter of the invention, before pre-gluing the die-cut which must be carried out on the die-cut before the insertion thereof into the cartoning apparatus of the invention.

In detail, see FIG. 20, this typology of die-cuts is made from a flat sheet of material, or a sandwich of overlapped sheets of different materials, which is cut so as to give it a predetermined shape.

This shape comprises a rectangular portion formed by four rectangular sections 10,15,20,25 placed side by side along a single flanking direction and separated from each other by respective folding segments 30,35,40 which allow a rectangular section to be easily inclined with respect to the proximal rectangular sections.

From each of these rectangular sections, on the opposite side of the same rectangular section two respective closing flaps 45,50,55,60 develop, which extend along a direction, perpendicular to the flanking direction of the rectangular sections, and which are separated from the respective rectangular sections by corresponding folding segments 65,70, 75,80 which develop along a direction parallel to the flanking direction.

The sheet also comprises a joining flap 85 which is located on one side of the rectangular portion intersected by the flanking direction and which by gluing is joined to a rectangular section that is opposite the rectangular section proximal to the joining flap.

Figure 22:
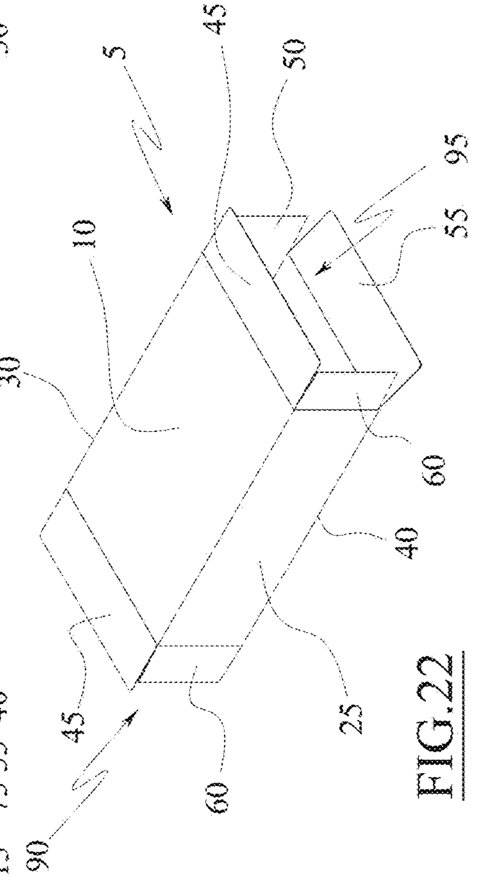
FIG. 22 is an axonometric view of the die-cut of FIG. 21 after it has been opened by the die-cut pick-up and manipulating machine.

In this way, when the joining flap is glued, the sheet has the shape of a tubular body (formed by the rectangular portion) having a rectangular cross section and which has a first opening 90 and a second opening 95 for accessing inside the tubular body that are closed by gluing the closing flaps together. This configuration, in which the die-cut is defined as an open die-cut, is illustrated in FIG. 22.

Figure 21:
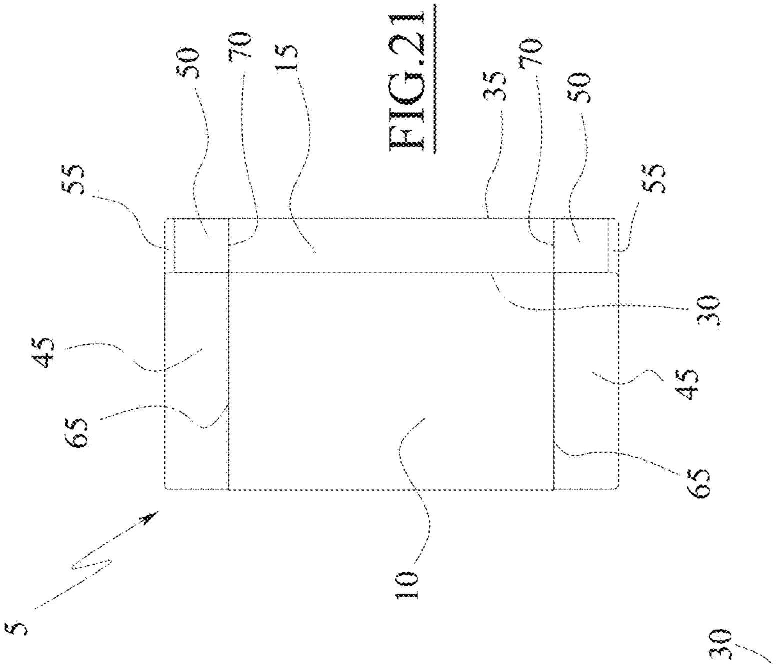
FIG. 21 is an orthogonal view of the die-cut of FIG. 20 after the pre-gluing operation and flattened on itself, i.e. it is the view of a pre-glued and flattened die-cut. In this configuration, in which the definable die-cut is closed, it is brought into the die-cut magazine to be then opened by the die-cut pick-up and manipulating machine.

Before inserting the products into the open die-cut, the die-cuts with the joining flap already glued are stored flattened, or in other words closed, so that two rectangular sections are in contact with the other two rectangular sections. This configuration, in which the die-cut is defined as a closed die-cut, is illustrated in FIG. 21.

At the inlet, the apparatus 1 comprises a sorting machine 100, which is configured to sort and arrange the items into clusters formed by a predetermined number of items. Furthermore, these dusters of items are sorted because they are formed by items arranged in rows and columns perpendicular to each other. By way of example, a cluster of items could consist of three flanked columns of items, each containing six items positioned along a row.

The sorting machine 100 is configured to transport the items and the dusters of items, while sorting them and arranging them into dusters, along a predetermined movement direction A, which is for example rectilinear and horizontal (however, it is not excluded that in an embodiment not illustrated it can be rectilinear and inclined with respect to a horizontal plane). It is specified that the phrase “movement direction” substantially coincides with “movement axis”.

The sorting machine 100 comprises a first stretch for channelling the items configured to sort a multitude of loose items entering the sorting machine into sets of items in which the items are aligned along rectilinear lines parallel to each other and each formed by single items that are flanked along an alignment direction.

In the illustrated embodiment, the first stretch comprises a plurality of vertical walls 105 parallel to the direction of advancement and spaced apart one another in such a way that their distance, measured along a horizontal axis, is lower than the horizontal width of two flanked items so as to form parallel channels that can be crossed by single items. For example, these vertical walls are adjustable in their mutual distance, so as to allow adaptation to items of different widths.

The movement of the items along the channel stretch takes place by means of a conveyor that defines a transport direction of the items which coincides with the movement direction A of the items of the sorting machine.

In detail, the conveyor that moves the items along the channels comprises a conveyor belt 110 which moves the items along the movement direction A along the channels, supporting them at the bottom.

Past the first stretch, the sorting machine 100 comprises a second stretch in which the items are arranged into clusters composed of a predetermined number of items.

In particular, the second stretch comprises a plurality of parallel conveyor belts, called chains, in a number equal to the number of channels, which support the rows of products in the channels at the bottom and are positioned immediately past the conveyor belt 110.

A plurality of pegs (not illustrated), mounted on respective bars transversal to the direction of travel, are inserted in a free space between each conveyor belt of the plurality of conveyor belts and the vertical walls of the respective channels. At least two of these bars are moved synchronously along the movement direction A, to select product clusters.

In particular, two bars that support the pegs are moved independently of each other in order to facilitate the detachment of a clustering of items from the other items in the channel.

2 arrangements of peg bars moved by 2 independent motors are required to select the product from the continuous flow because when the front bar accelerates to detach the pre-established arrangement of rows of containers, the other bar must have already been inserted in the separation point to hold the subsequent containers at the constant production speed.

The pegs are shaped so that they fit between two items, that is, between two cans/bottles.

Past the plurality of conveyor belts, the sorting machine provides for a plurality of horizontal rods 115 (in the figures only one rod 115 is illustrated for simplicity’s sake of illustration), arranged with their respective longitudinal axes perpendicular to the movement direction A, which are moved, spaced from each other by a predetermined length (called machine pitch), along a closed loop path, for example defined by a pair of closed loop chains, each of which is associated with a respective longitudinal end of each rod, which has at least one horizontal stretch along which each rod moves along the movement direction A, with the same direction of advancement of the items. This serves to further accelerate the speed of a cluster of items with respect to the plurality of conveyor belts. Basically, the item will be always accelerating between the lowest speed of the conveyor belt 110, passing to an intermediate speed of the plurality of successive conveyor belts, and finally moving to a higher speed by means of the tines (step speed of a pusher element, as will be described below).

In the illustrated embodiment, in the second stretch the items are approached towards one side (parallel to the movement direction A) of the sorting machine.

For example, this second stretch comprises two opposite vertical walls 120, inclined with respect to the movement direction A in order to define a channel inclined with respect to the movement direction A.

The apparatus 1 comprises a die-cut magazine 125, in which the die-cuts 5 are stored in a closed conformation, i.e. folded on themselves as illustrated in FIG. 21.

The die-cut magazine is flanked in plan to the sorting machine and is spaced therefrom so that between the die-cut magazine 125 and the sorting machine there is a passage gap 126 with a width greater than 50 cm in at least one stretch of the passage gap. It should be noted that width means the minimum distance between the die-cut magazine and the sorting machine, measured along a horizontal axis.

In particular, the passage gap comprises an opening for the access to the passage gap 126 through which an operator can access the space between the sorting machine and the die-cut magazine, which has a width of at least 50 cm, preferably at least 80 cm.

The die-cut magazine 125 can comprise a support surface 130 (substantially defining a horizontal support surface) on which the die-cuts are positioned upright, flanked and in contact with each other along a horizontal direction, and inclined with respect to a vertical plane, for example by an angle comprised between 10° and 30°. As a further detail, flat faces of the die-cuts, i.e. of the rectangular sections, are inclined with respect to said vertical plane by this angle.

Figure 1:
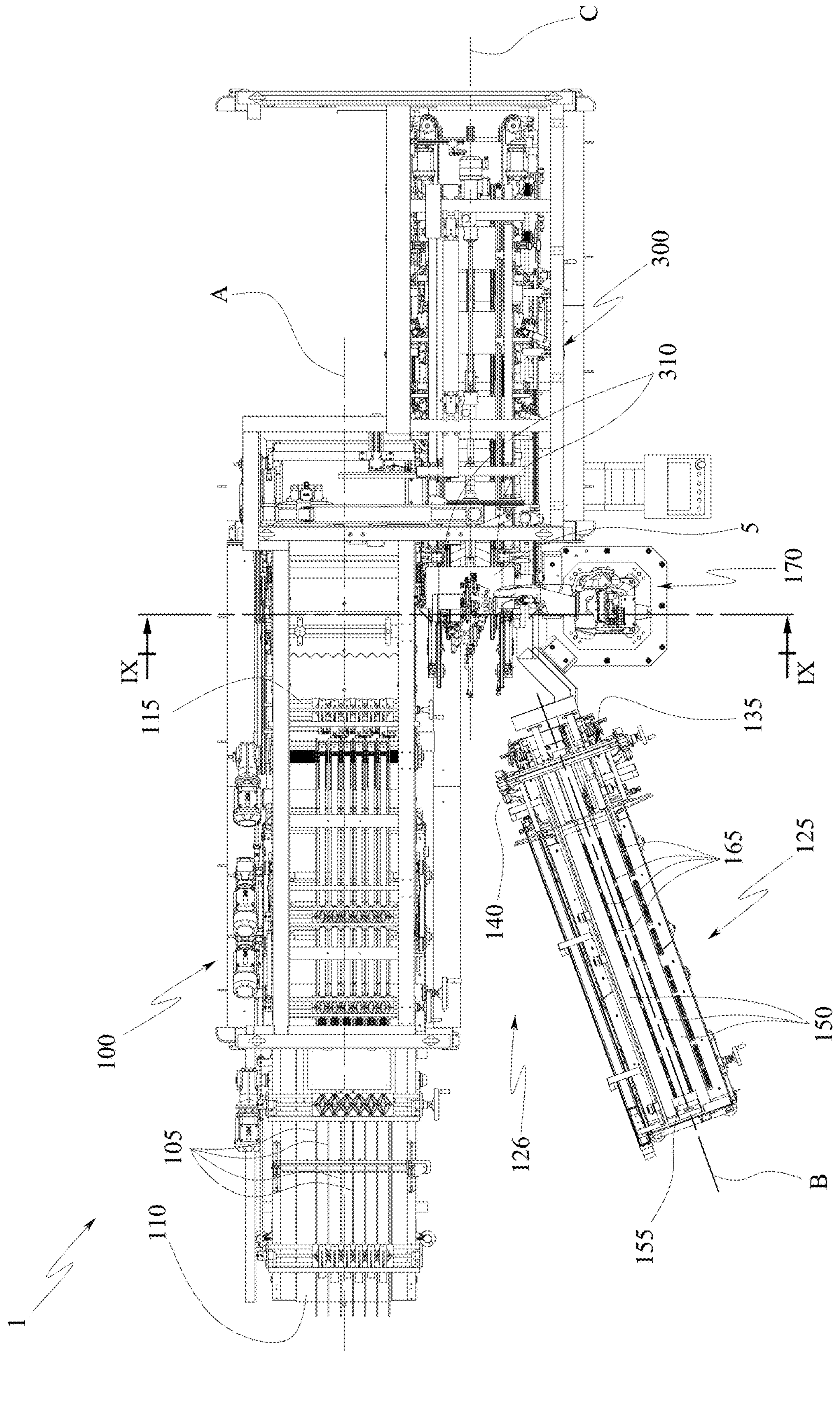
FIG. 1 is an orthogonal plan view of the cartoning apparatus according to the invention.
Figure 2:
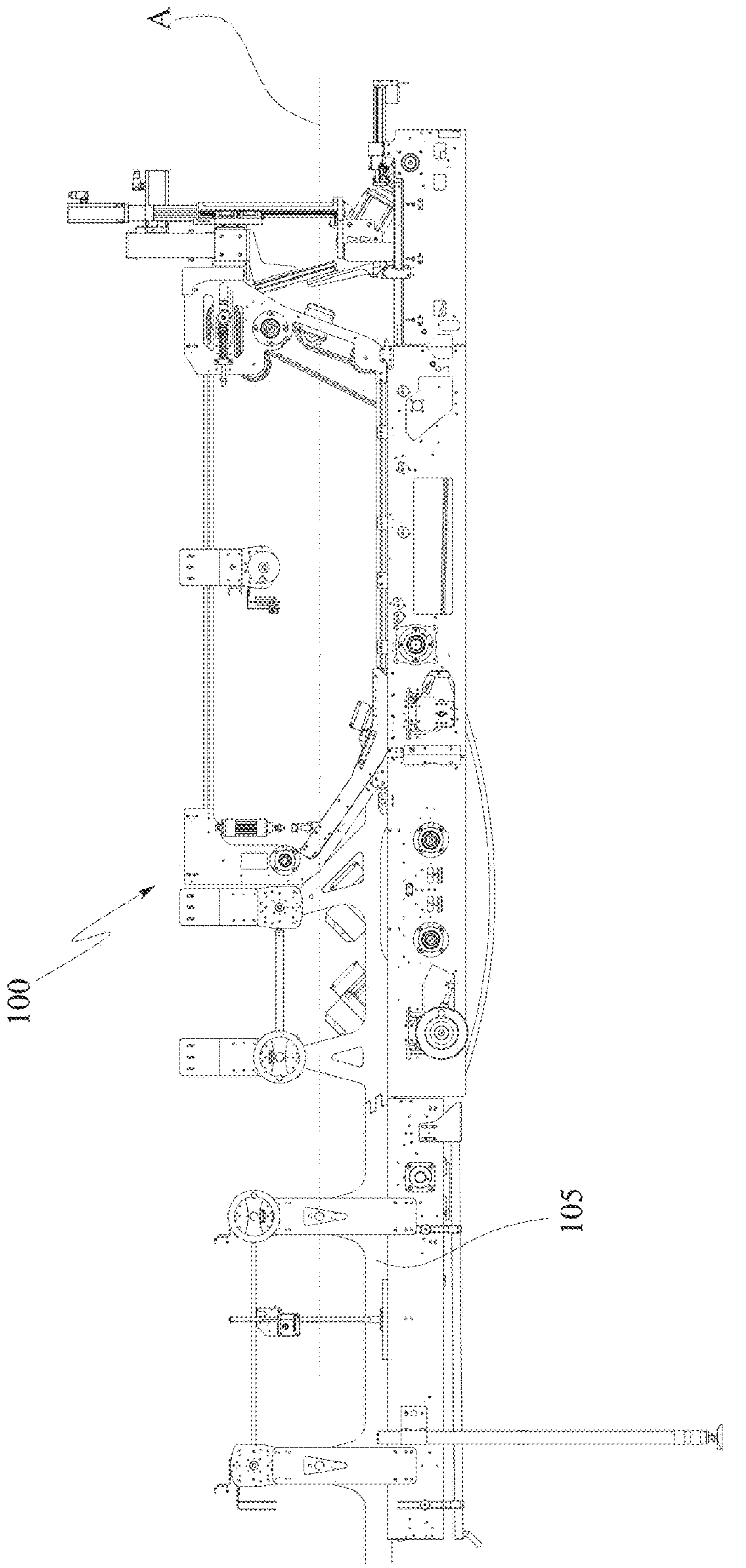
FIG. 2 is a side orthogonal view of a sorting machine of the cartoning apparatus of FIG. 1 isolated from the rest of the apparatus.
Figure 3:
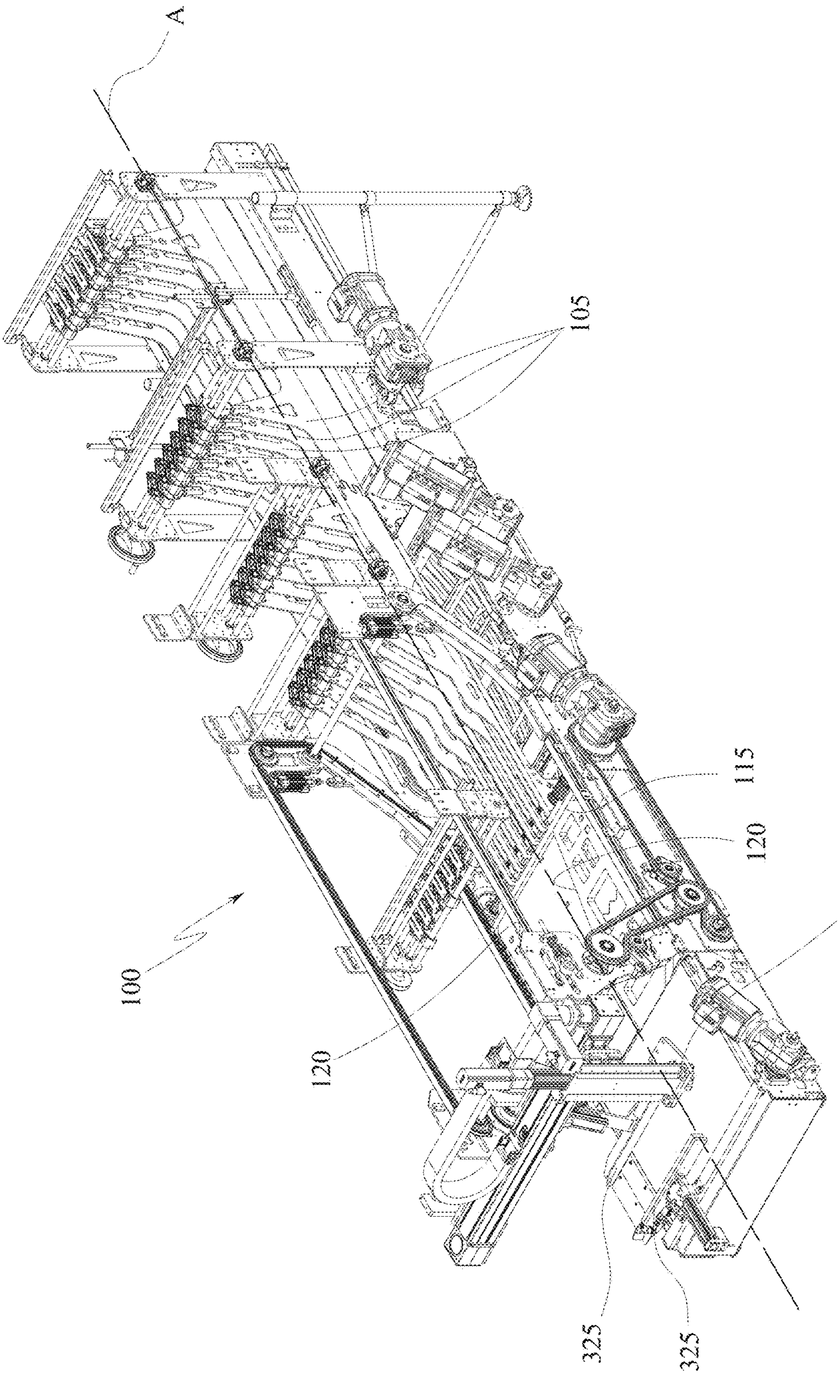
FIG. 3 is an axonometric view of the sorting machine of FIG. 2.
Figure 4:
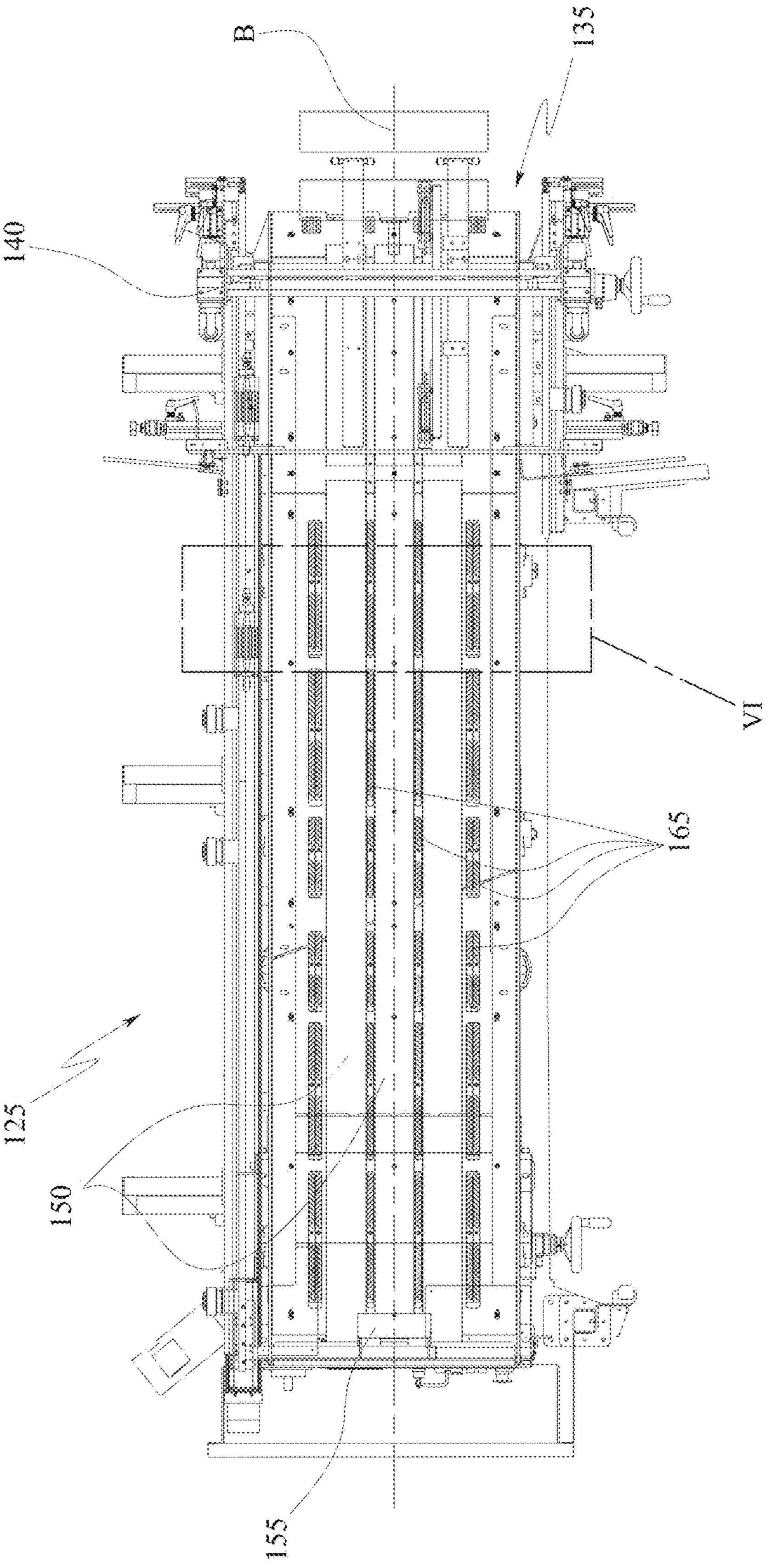
FIG. 4 is an orthogonal plan view of a magazine of the die-cuts of the cartoning apparatus of FIG. 1, isolated from the rest of the cartoning apparatus.
Figure 5:
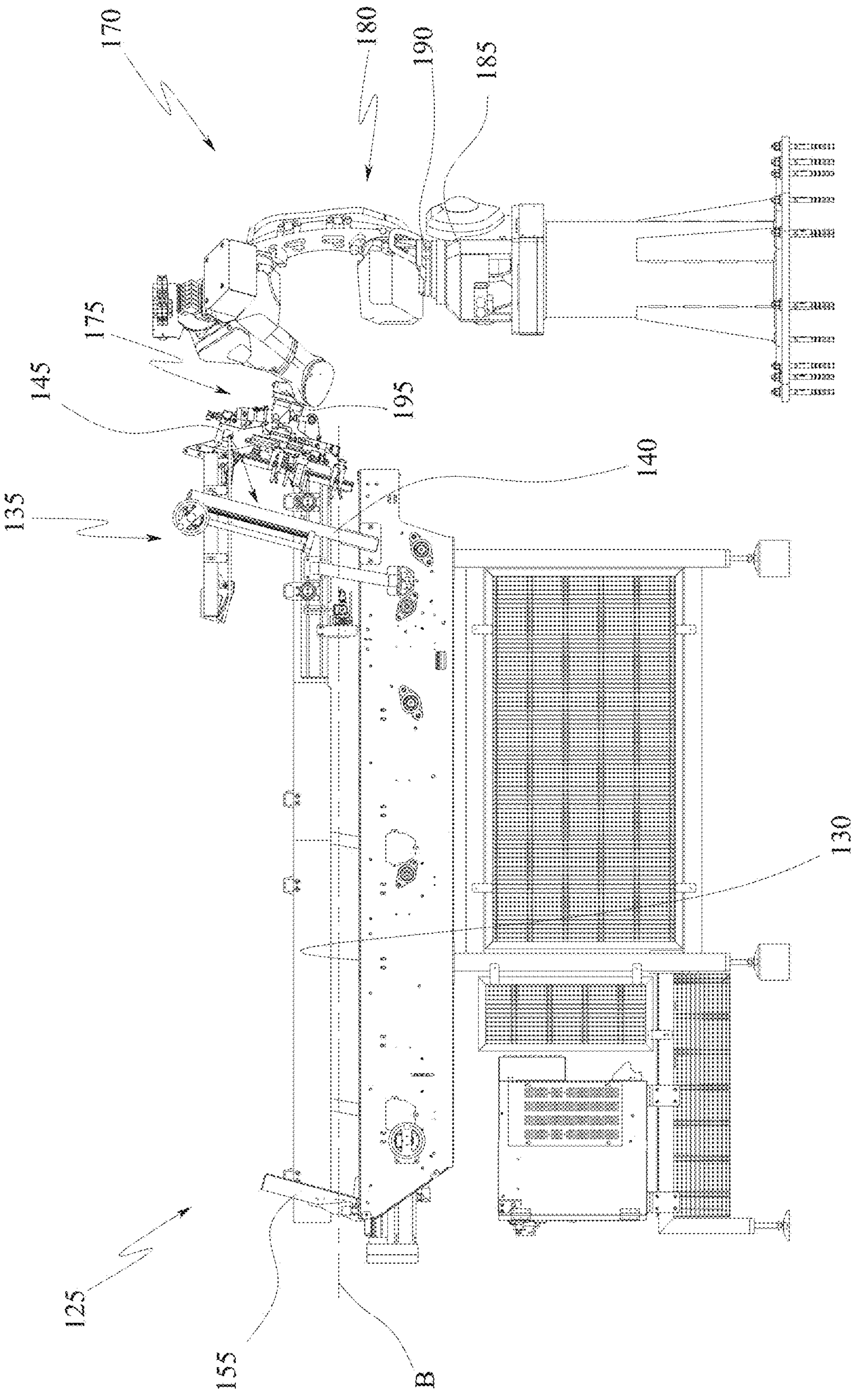
FIG. 5 is an orthogonal view of the magazine of the die-cuts of FIG. 4 and of a machine for picking up and manipulating die-cuts of the cartoning apparatus of FIG. 1, isolated from the rest of the cartoning apparatus.

The die-cut magazine 5 is provided with a transport arrangement configured to move the die-cuts to a pick-up area 135 of the die-cuts of the magazine. In practice, in this area the die-cut magazine 5 comprises an aperture 140, defining an opening 145 for the exit of the die-cuts (see in particular FIG. 5), lying on a vertical plane or for example lying on an inclined plane with respect to a vertical plane, preferably at an angle comprised between 10° and 30°, to which aperture at least one abutment element, preferably a plurality of abutment elements, is associated, for example provided with idle wheels that come into contact with the die-cut, which retain the die-cuts inside the magazine when the transport arrangement is off and also under the thrust of the transport arrangement, or prevent it from coming out if the first die-cut in the pick-up area is not dragged to the outside of the magazine through the outlet opening by suitable means, as will become clearer below.

The transport arrangement of the die-cut magazine 125 is configured to move the die-cuts 5 present in the magazine towards the pick-up area 135 along a movement direction B, for example rectilinear and horizontal (it is not excluded that it may be rectilinear and inclined with respect to a horizontal plane).

This movement direction B is the same along which the die-cuts present in the magazine are placed side by side.

Furthermore, this movement direction B is transversal (from a point of view from above, or in plan) with respect to the movement direction A of the sorting machine 1.

In particular, the movement direction B forms an acute angle with the movement direction A, for example comprised between 10° and 45°, preferably comprised between 15° and 25°.

The pick-up area 135 of the die-cut magazine 125, which is located at a longitudinal end of the magazine along the movement direction B, is closer to the sorting machine 100 than a longitudinal end of the magazine opposite the pick-up area.

Furthermore, the die-cut magazine is flanked in plan to the sorting machine and also in consideration of the fact that, as is known, the sorting machine is mainly developed in the movement direction A (from a point of view in plan) and the die-cut magazine is mainly developed along the movement direction B (from a point of view in plan), there is the passage gap 126 between the two machines that permits to an operator to pass in the space between the two machines, for example to recover items that overturned during their movement or to carry out maintenance operations.

This passage gap 126 widens (understood as the minimum distance measured along a horizontal axis) going from the pick-up area to the end of the die-cut magazine opposite the pick-up area, and in its portion of maximum width it measures at least 50 cm, preferably at least 80 cm.

The movement arrangement comprises a conveyor belt 150, preferably a plurality of conveyor belts 150, which supports the die-cuts at the bottom and moves them towards the pick-up area by imparting a thrust along the movement direction B. In detail there are several conveyor belts aligned along the movement direction B and operated by independent actuators in order to better govern the thrust towards the pick-up area generated on the die-cuts.

The conveyor belt is preferably assisted by a pusher element 155, which is configured to move the plurality of die-cuts in the magazine along the movement direction B by pushing on the last die-cut, i.e. the die-cut distal from the pick-up area.

Said conveyor belt 150, or said conveyor belts 150, at least partially define the support surface 130 of the die-cuts in the magazine. Another portion of the support surface could be defined by a rigid support plane of the magazine.

In the illustrated embodiment, the pusher element is of the electric type, i.e. it comprises an electric actuator that generates the thrust to move the die-cuts towards the pick-up area. The control, understood as a modulation of the thrust force exerted by the actuator, can be performed by controlling the position of the actuator or by measuring the force applied on the die-cuts. (an adequate thrust force is applied based on the current carton buffer, which is read by the electric actuator encoder).

Alternatively the pusher element could be pneumatic, i.e. it could comprise a pneumatic actuator, the control of which must be carried out by measuring the force applied on the die-cuts.

The measurement of the exerted force can be carried out by means of suitable sensors positioned in the pick-up area, for example fixed to the aperture, as is known to the person skilled in the art.

The die-cut magazine comprises an electronic control and command unit (not illustrated) configured to synchronously actuate the conveyor belt and the pusher element in moving the die-cuts towards the pick-up area along the movement direction B.

In the illustrated embodiment, the magazine of the die-cuts is of the manual loading type, however it is not excluded that in an alternative embodiment the magazine may be of the automated type. If the die-cut magazine is of an automated type, the die-cuts are clustered into a plurality of vertical stacks placed side by side one another along the movement direction B, instead of being arranged in the magazine along a single horizontal row as in the manual loading type, and are moved by the conveyor belt towards the pick-up area, where the top die-cut of the stack in the pick-up area is picked up from above for subsequent operations.

Regardless of the conformation of the movement arrangement, in order to prevent or at least limit a sliding of the die-cuts with respect to their rest point on the support surface backwards, in particular in a direction opposite to that of movement of the die-cuts imparted by the movement towards the pick-up area, the die-cut magazine can comprise at least one brush, preferably a plurality of brushes extending along the entire length in the movement direction B of the support surface 130 (the cartons in the pick-up area being inclined by 15° with respect to a vertical plane, without the brushes on the rest plane, would slide during loading assuming a horizontal position).

Figure 6:
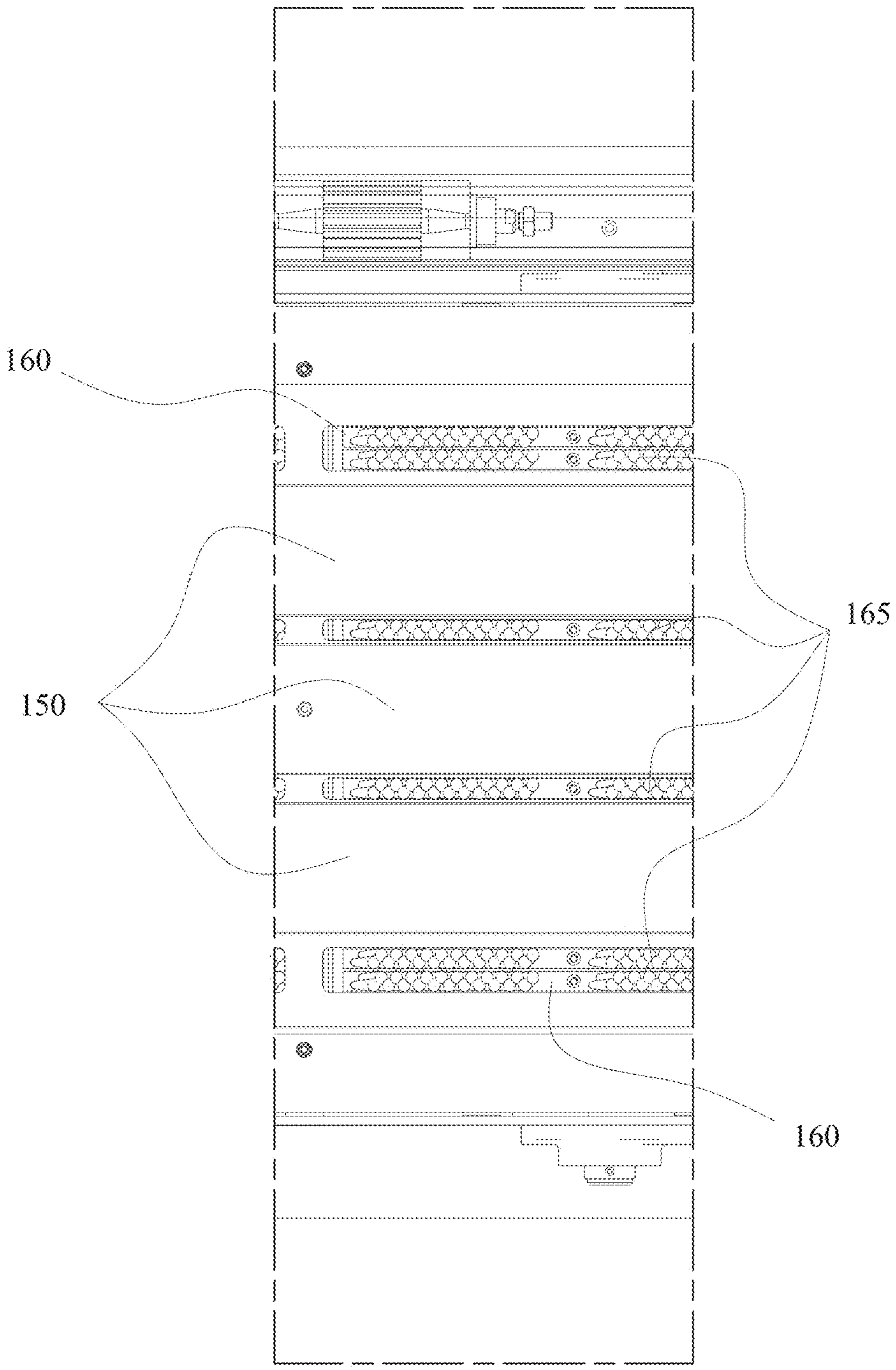
FIG. 6 is an enlargement of detail VI in FIG. 4.
Figure 7:
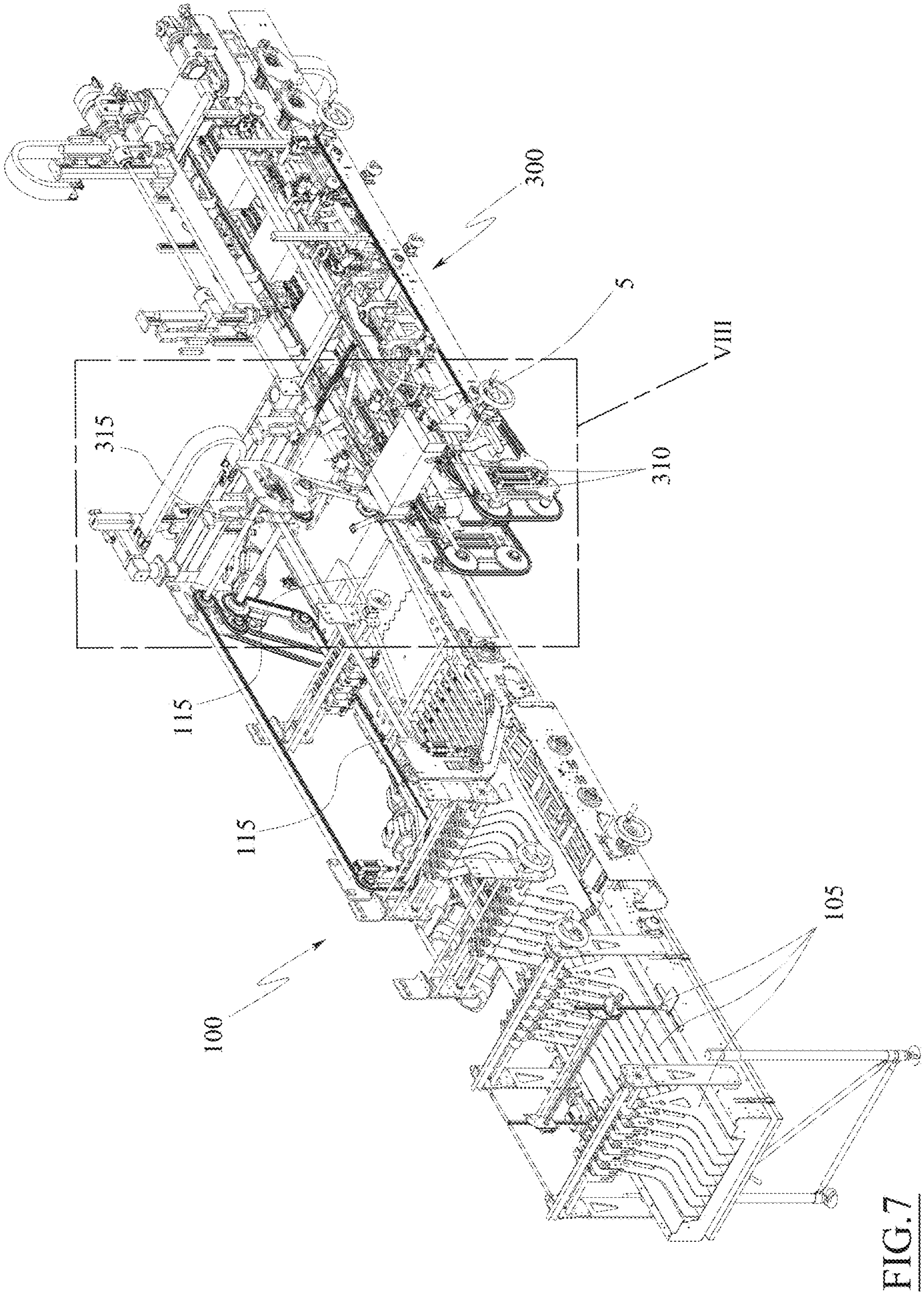
FIG. 7 is an axonometric view of the sorting machine of FIG. 3 together with a machine for inserting the clusters of items into the open die-cuts and for closing the open die-cuts of the cartoning apparatus of FIG. 1, isolated from the rest of the cartoning apparatus.
Figure 8:
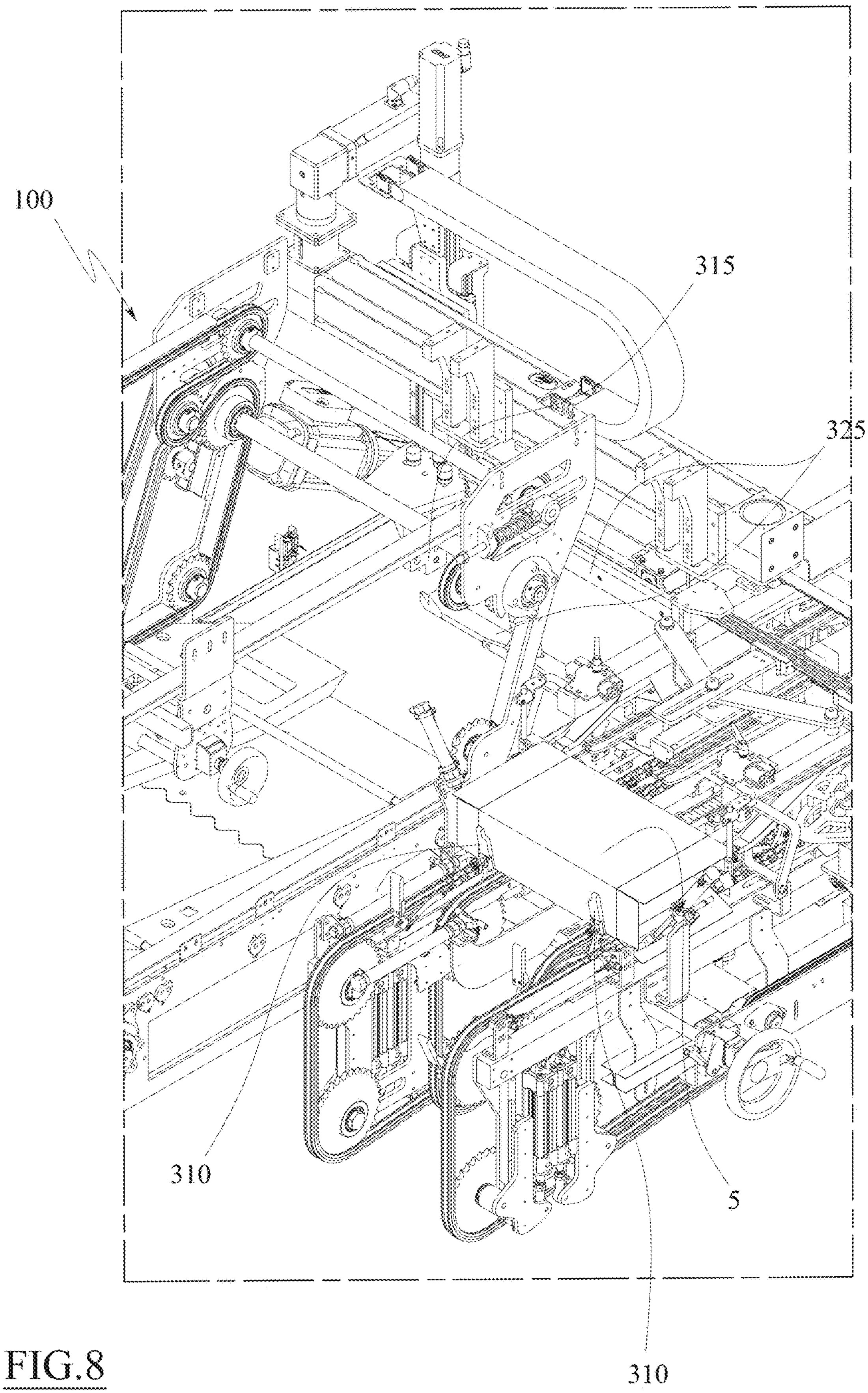
FIG. 8 is an enlargement of detail VIII in FIG. 7.
Figure 9:
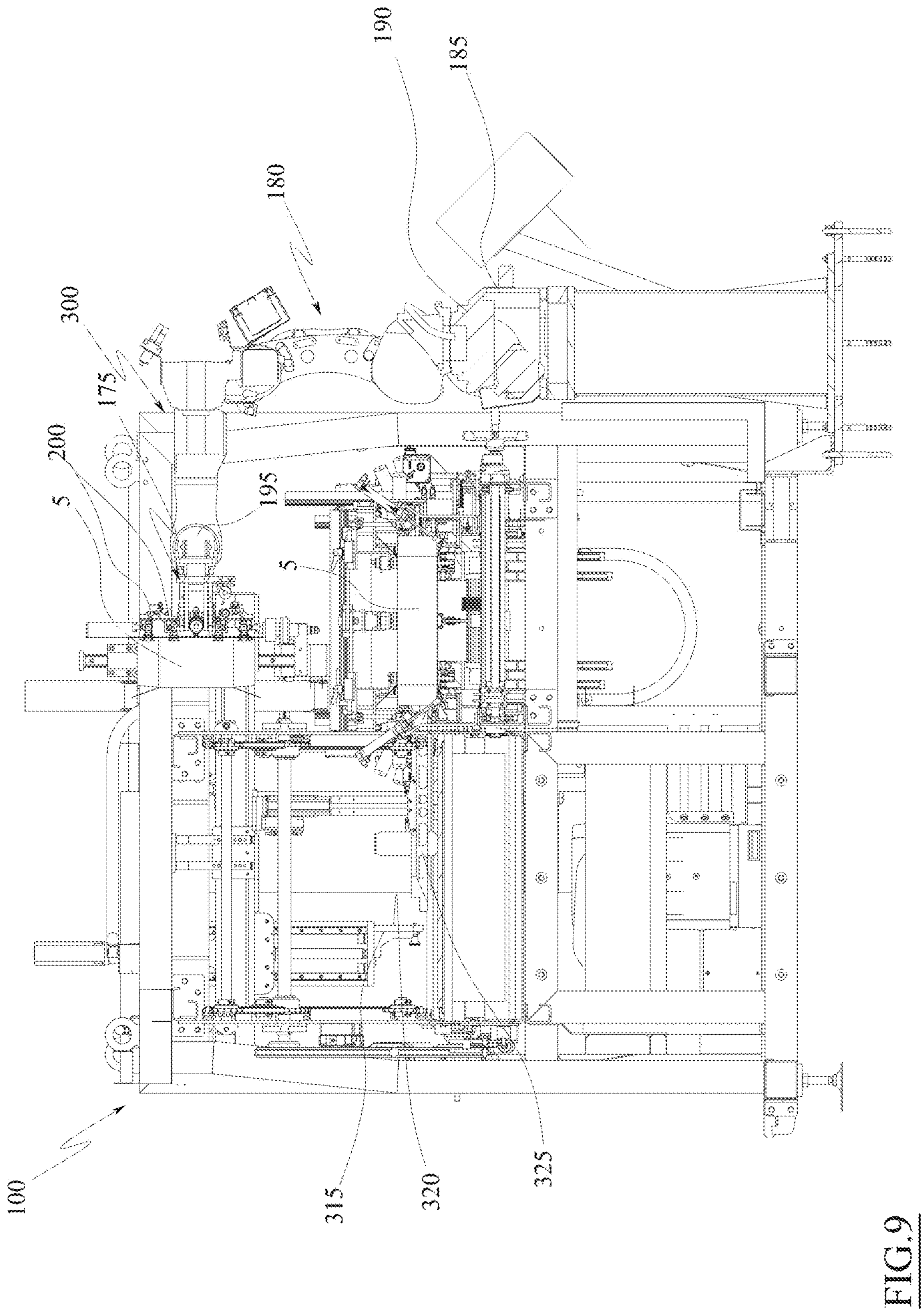
FIG. 9 is a sectional view of the cartoning apparatus of FIG. 1 according to the section plane IX-IX.
Figure 10:
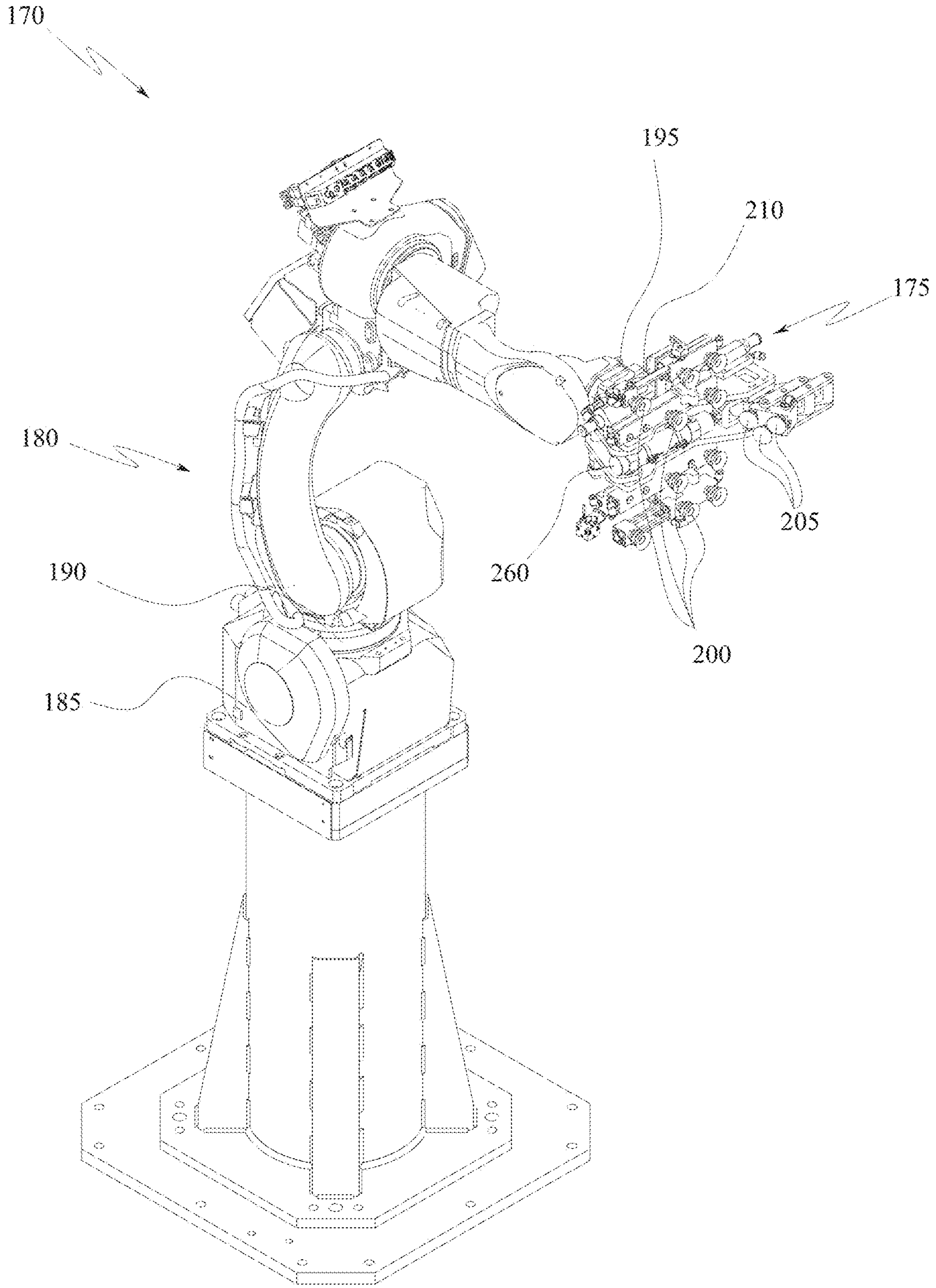
FIG. 10 is an axonometric view of the die-cuts pick-up and manipulating machine.
Figure 11:
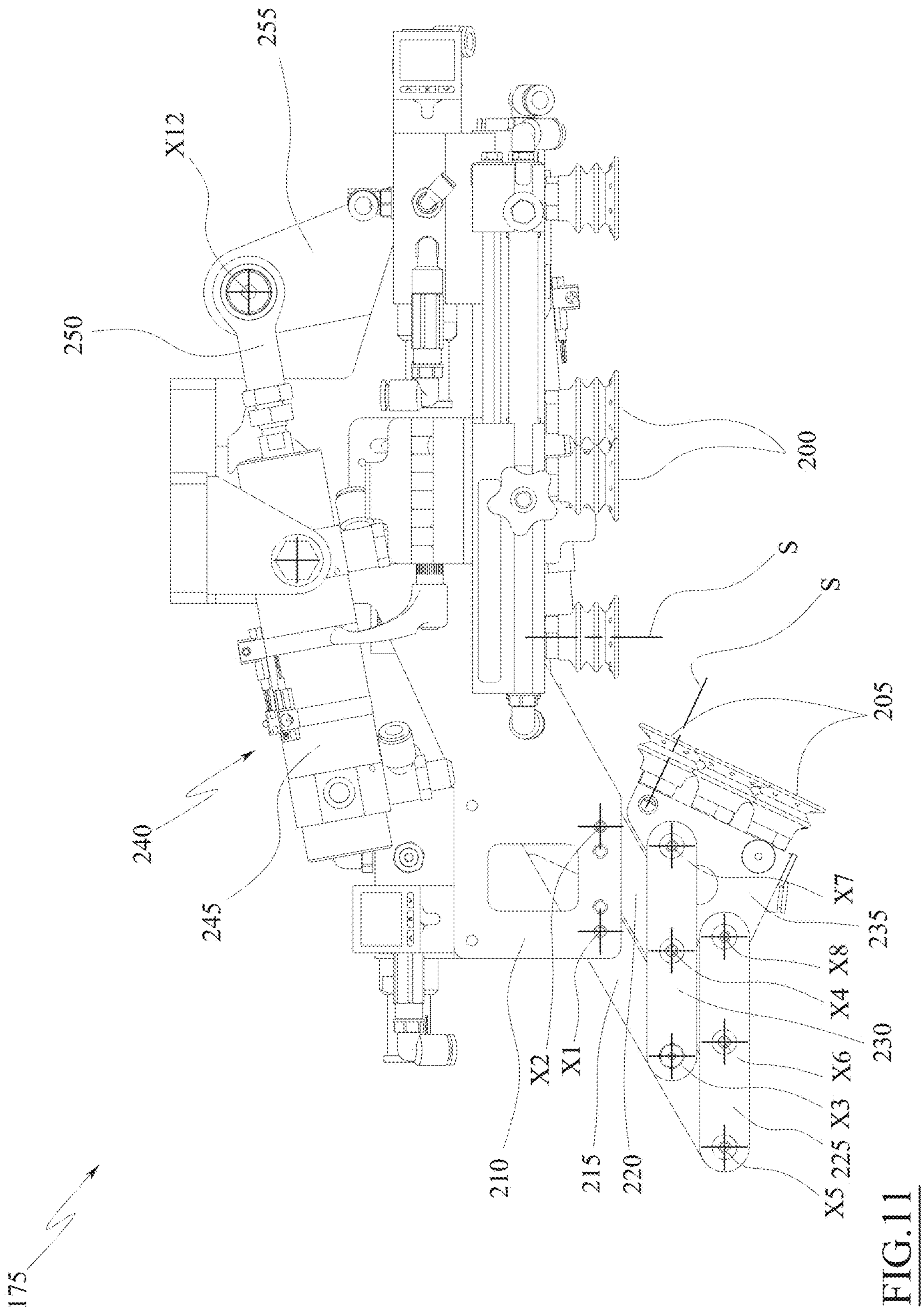
FIG. 11 is an orthogonal view of a module for gripping and manipulating the die-cuts of the machine for picking up and manipulating the die-cuts of FIG. 10, isolated by a robotic arm on which the module is installed. In particular, in FIG. 11 the module is shown in a position for seizing the die-cuts, which is a position that the module assumes when it is brought into contact with a die-cut to be picked up that is present in the die-cut magazine.
Figure 12:
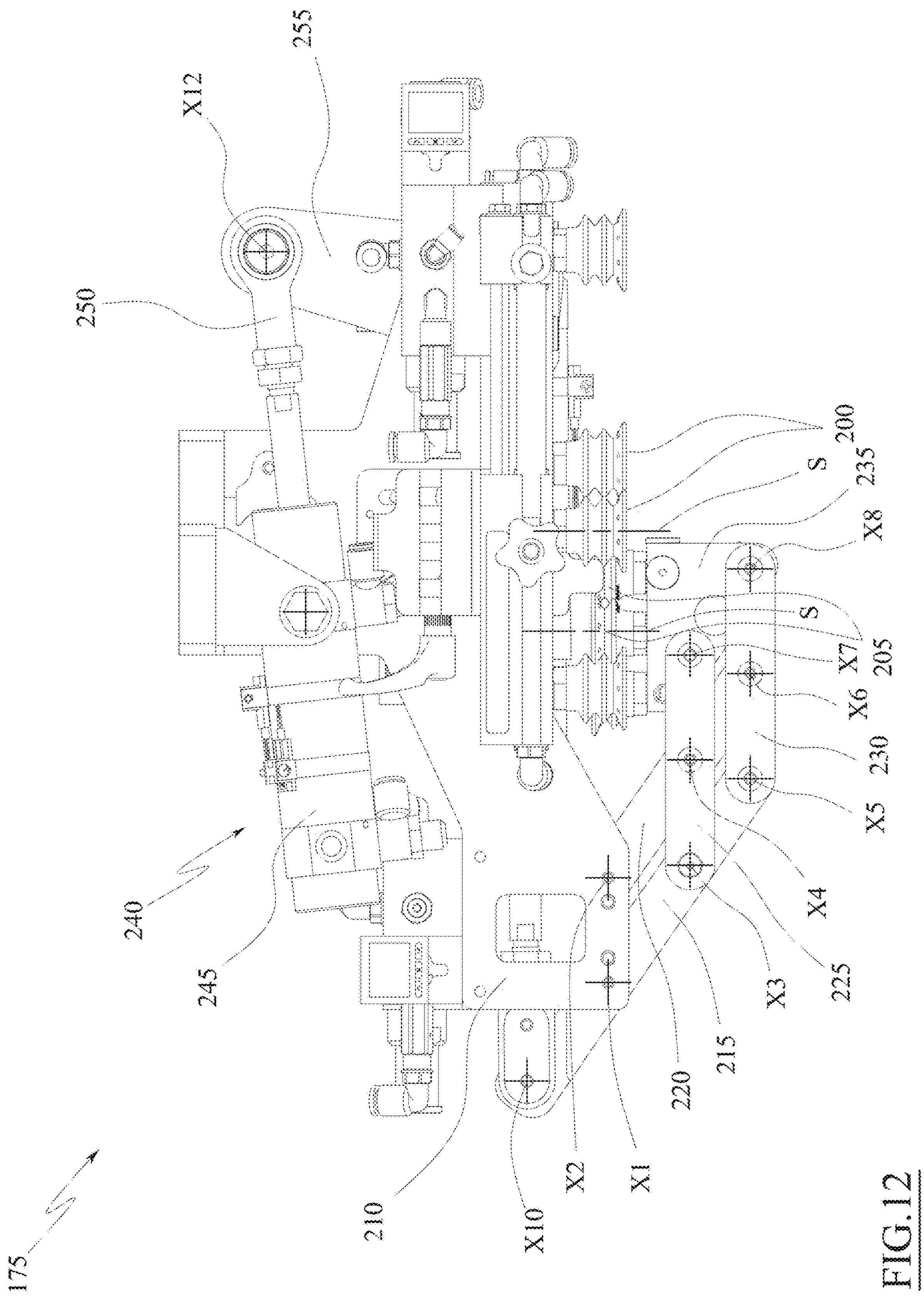
FIG. 12 is an orthogonal view of the module for gripping and manipulating the die-cuts of FIG. 11, shown in a start-to-open position of a previously seized die-cut.
Figure 13:
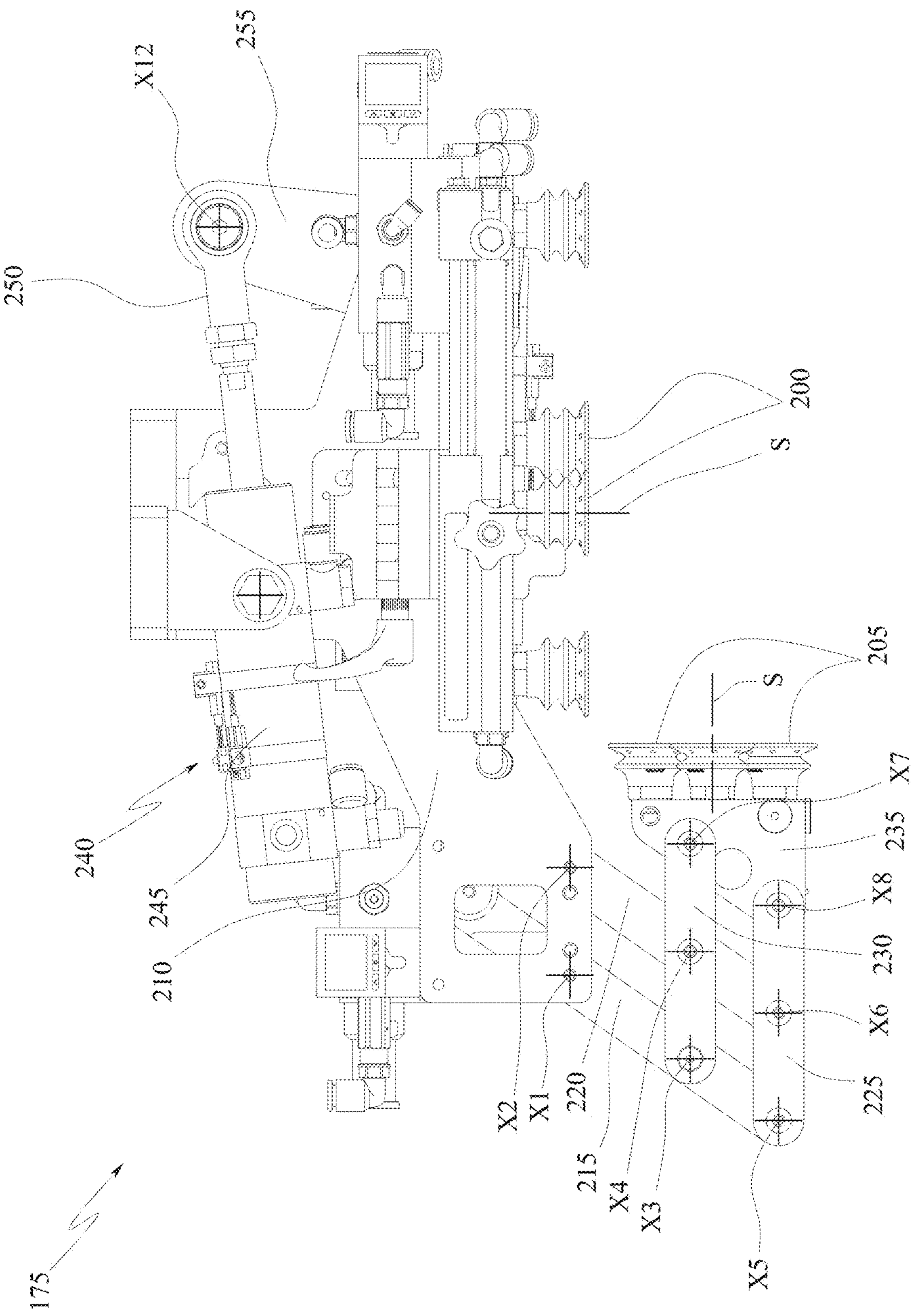
FIG. 13 is an orthogonal view of the module for gripping and manipulating the die-cuts of FIG. 11, shown in an end-to-open position of a previously seized die-cut.
Figure 14:
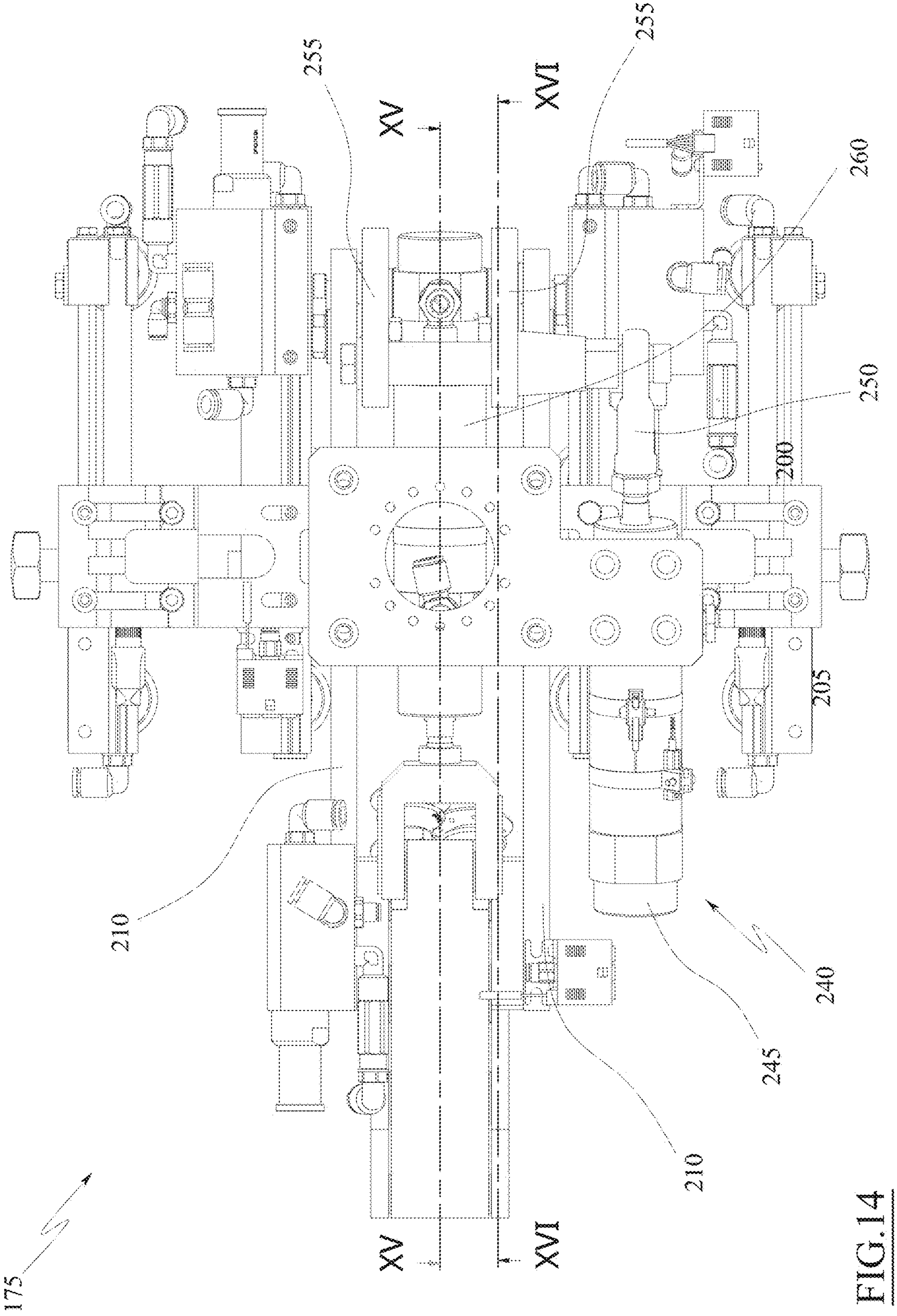
FIG. 14 is an orthogonal view of the gripping and manipulating module illustrated in FIG. 11, depicted from a point of view rotated by 90° with respect to a point of view from which the view of FIG. 11 is realized.
Figure 15:
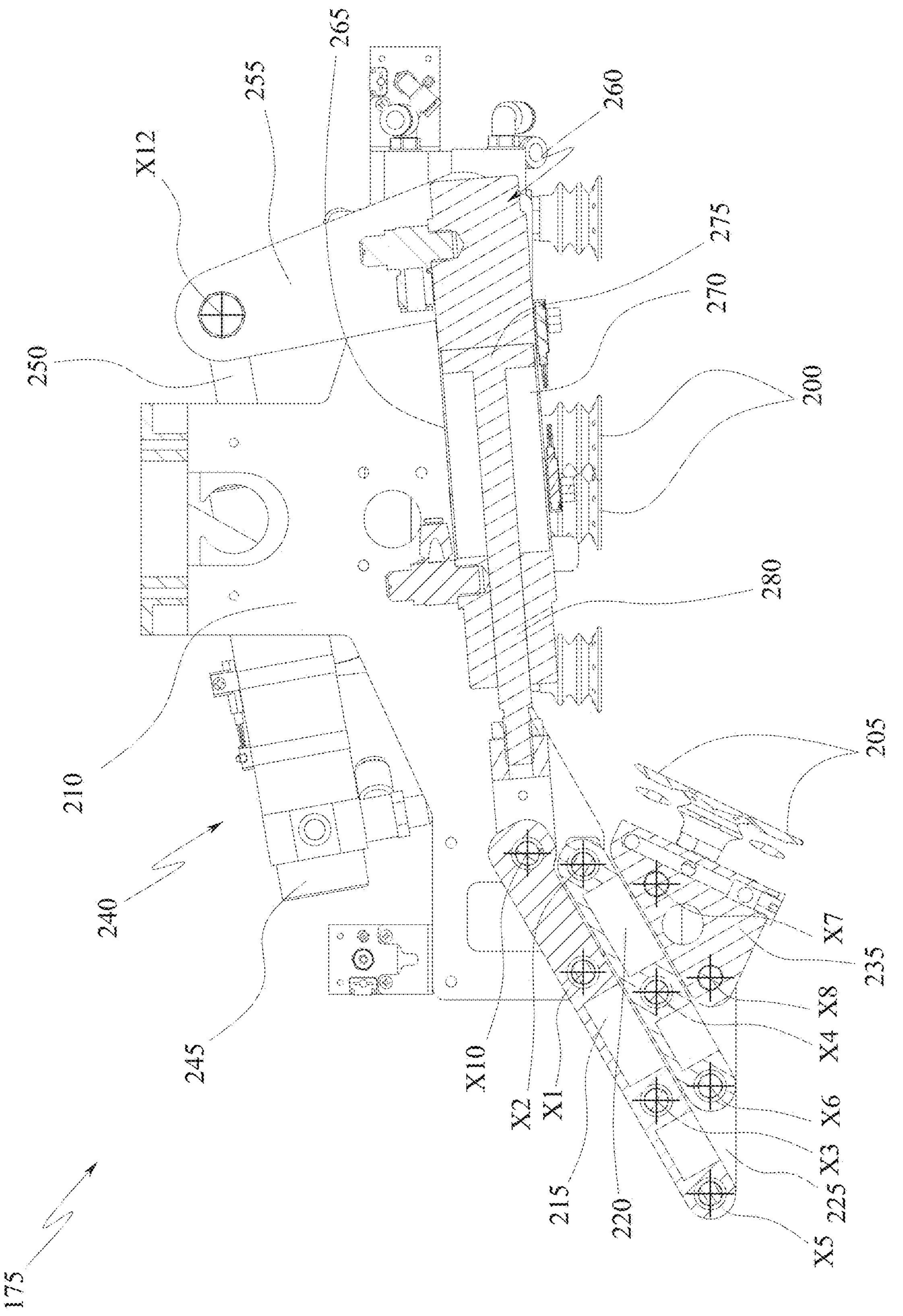
FIG. 15 is a sectional view of the gripping and manipulating module of FIG. 14 according to the section plane XV-XV.
Figure 16:
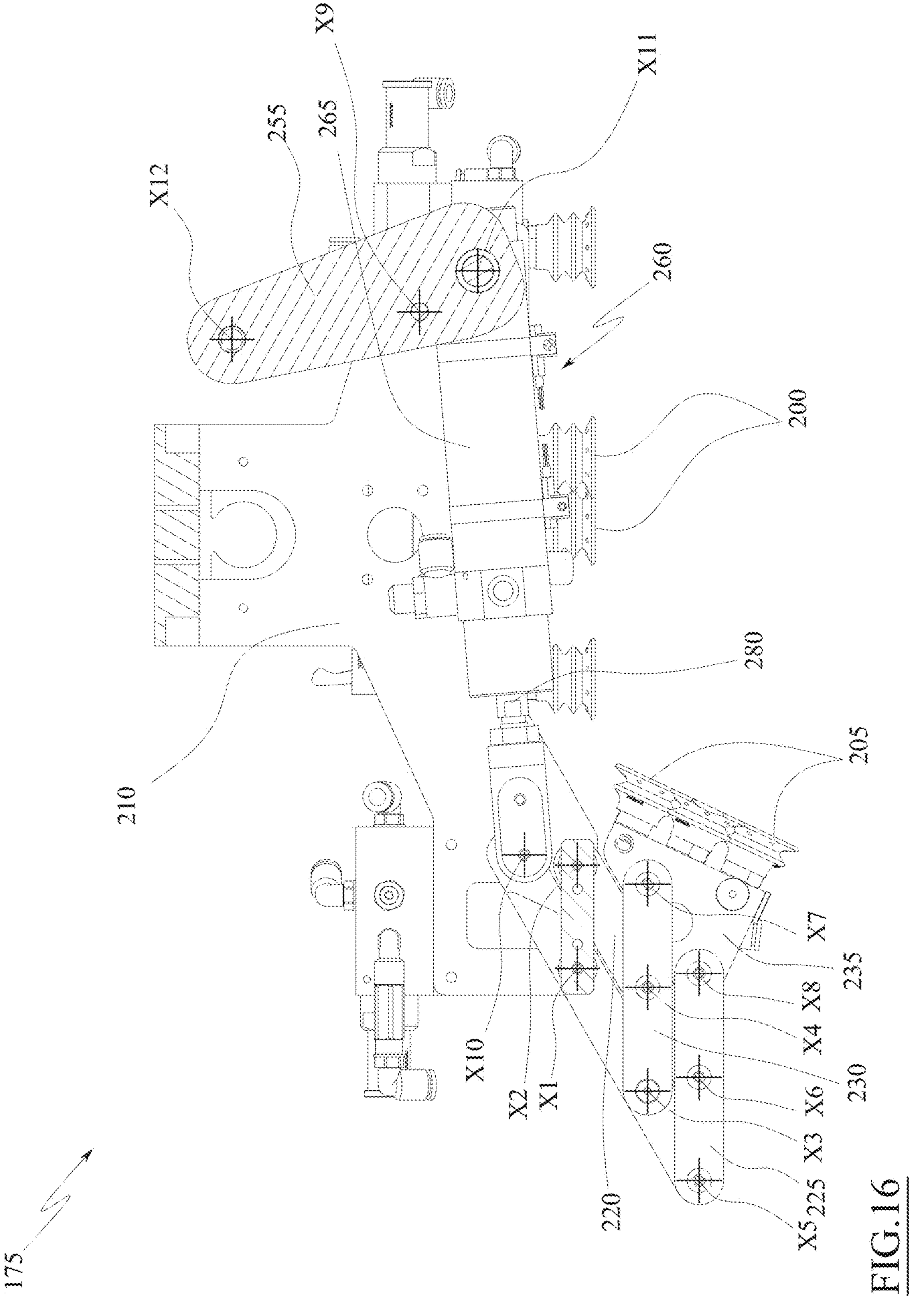
FIG. 16 is a sectional view of the gripping and manipulating module of FIG. 14 according to the section plane XVI-XVI.
Figure 17:
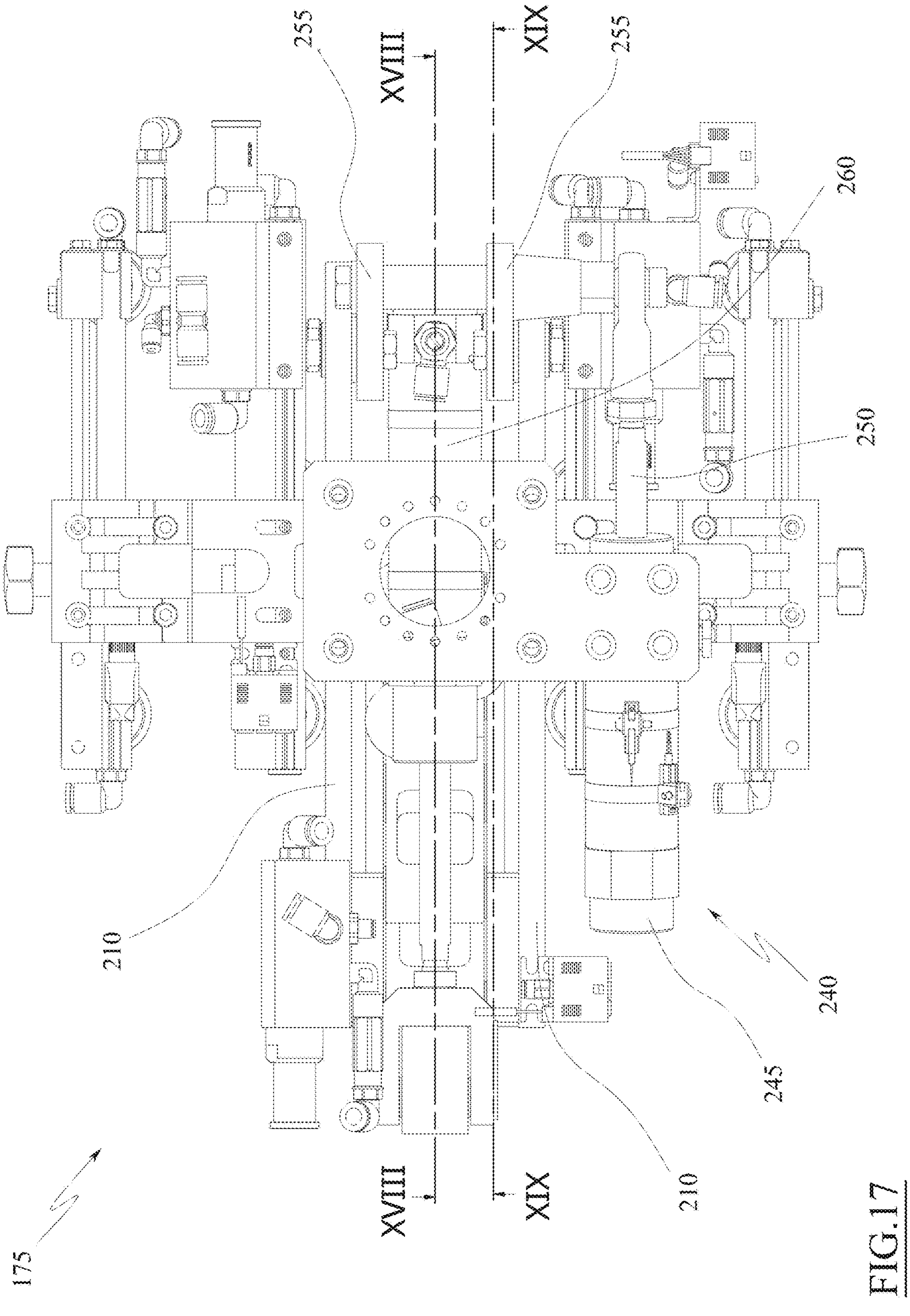
FIG. 17 is an orthogonal view of the gripping and manipulating module illustrated in FIG. 12, depicted from a point of view rotated by 90° with respect to a point of view from which the view of FIG. 12 is realized. This point of view is the same as in FIG. 14.
Figure 18:
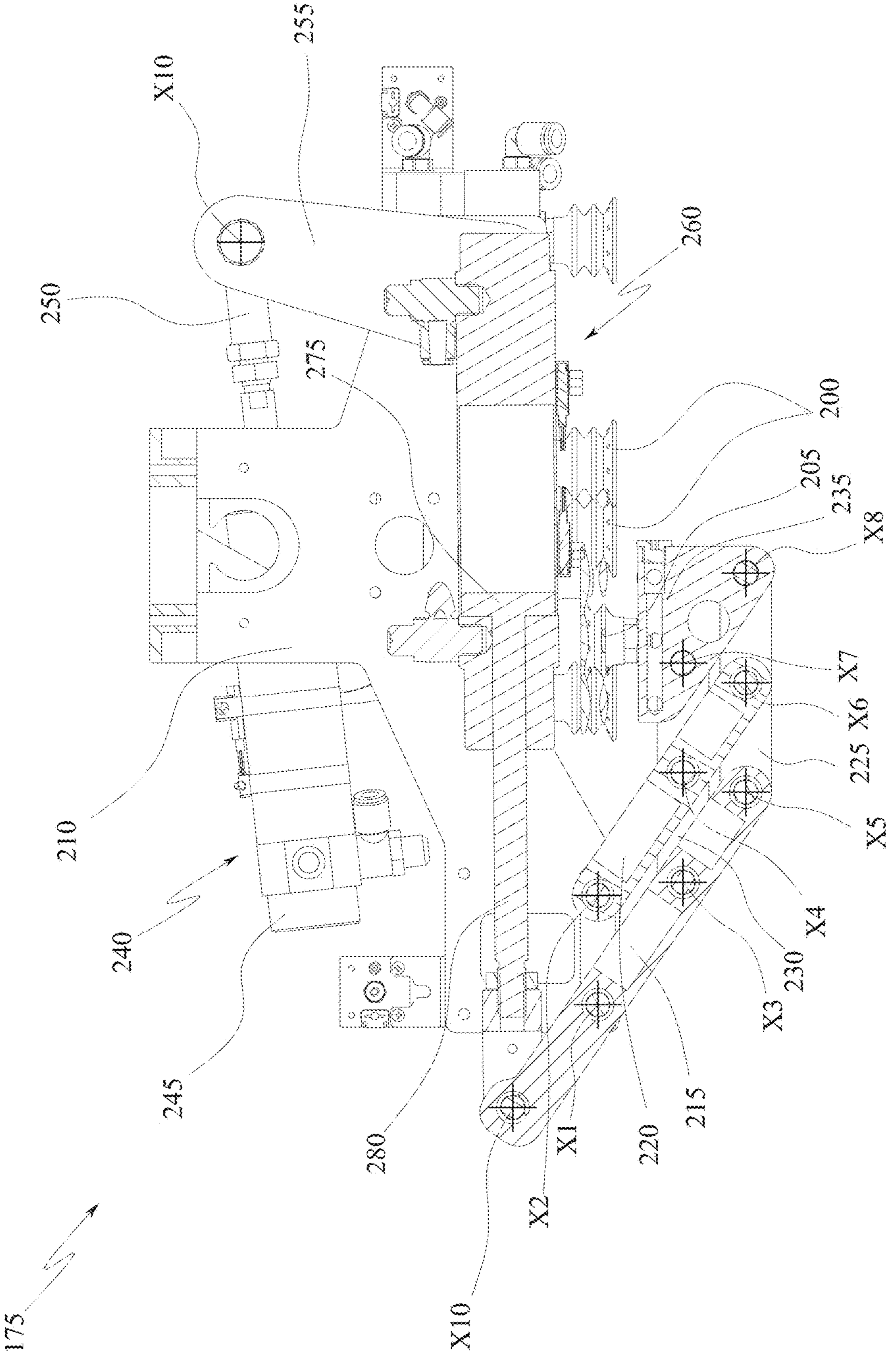
FIG. 18 is a sectional view of the gripping and manipulating module of FIG. 17 according to the section plane XVIII-XVIII.
Figure 19:
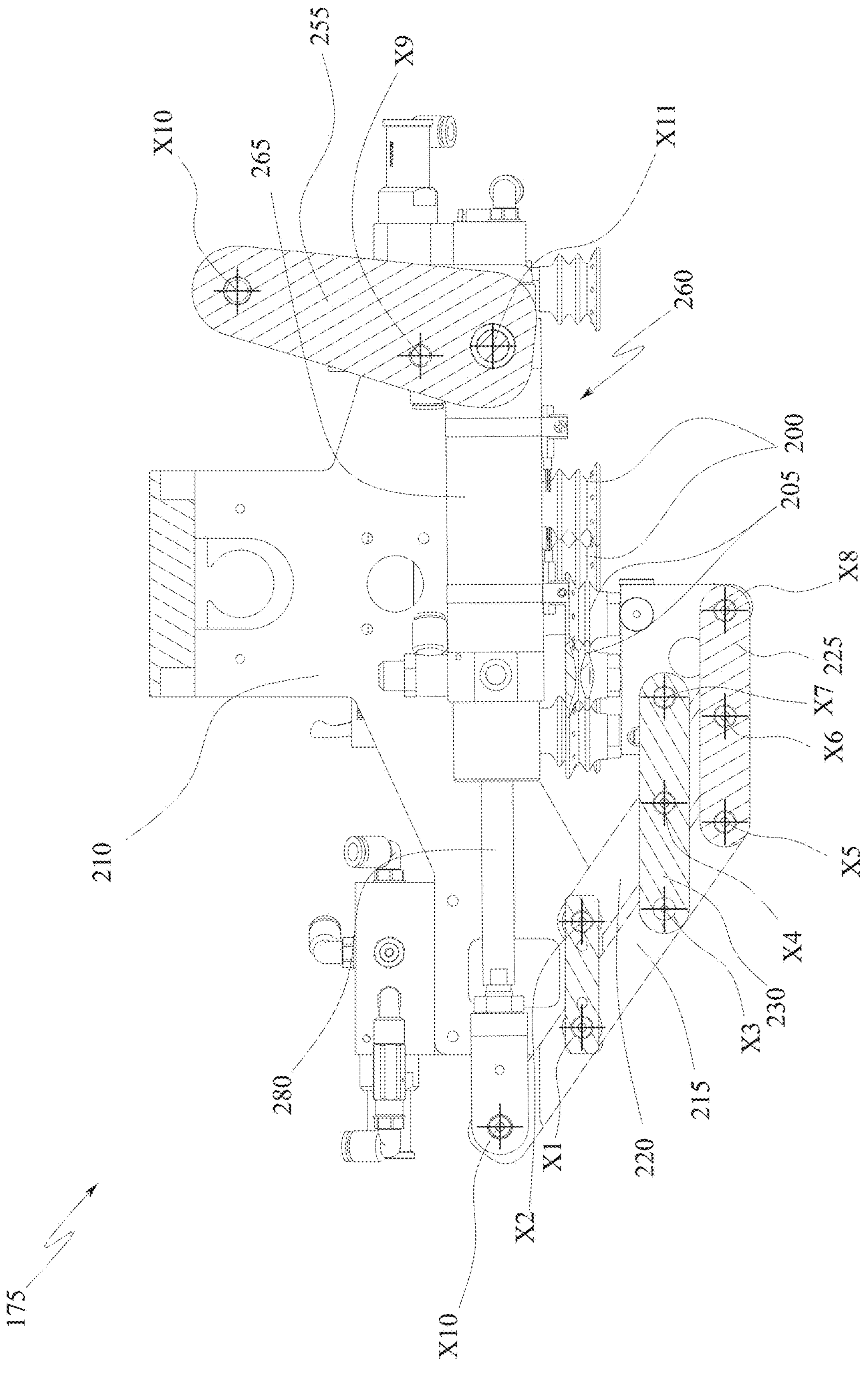
FIG. 19 is a sectional view of the gripping and manipulating module of FIG. 17 according to the section plane XIX-XIX.

This brush is provided with a rigid body 160 (see in particular the enlargement in FIG. 6) from which a plurality of bristles 165 rise upwards and protrude above the support surface.

The bristles 165 are substantially rectilinear and are inclined, with respect to the rigid body to which they are fixed, towards the pick-up area, for example forming an angle with a vertical plane comprised between 10° and 45°.

The apparatus 1 comprises a machine for picking up and manipulating the die-cuts 170, configured to pick up the die-cuts 5 from the die-cut magazine 125 and manipulate them so as to open each die-cut and give it the shape of an open box. In particular, said machine picks up the die-cuts in the configuration of FIG. 21 and manipulates them so as to open them, bringing them into the configuration of FIG. 22.

In detail, this die-cut pick-up and manipulating machine 170 comprises a die-cut gripping and manipulating module 175 configured to seize the die-cuts and to manipulate them so as to open each die-cut, giving it the shape of an open box. The gripping module is entirely connected to the robotic arm and performs the operation of opening the die-cut and of picking up the die-cut from the magazine with no need for other machinery.

The die-cut pick-up and manipulating machine can comprise a robotic arm 180 on which the die-cut gripping and manipulating module is installed.

The robotic arm can comprise a fixed base 185, i.e. immobile with respect to the ground, or still immobile with respect to respective frames for bearing the die-cut magazine and the sorting machine, and a kinematic chain which is provided with a plurality of rigid members connected one another by means of joints, which can for example be ball joints, prismatic joints or drive joints.

The kinematic chain comprises a first rigid member 190 which is movably coupled to the base by means of a joint, for example comprising a drive joint which permits a rotation with respect to the base with respect to a vertical axis of rotation, and a last rigid member 195 to which the gripping and manipulating module is connected, for example directly and without residual degrees of freedom.

A plurality of rigid members can be interposed between the first and last rigid members according to the type of robotic arm.

In the illustrated embodiment, the robotic arm is an anthropomorphic robot, also known as a six-axis robot, and the last rigid member corresponds to a so-called robot wrist.

The gripping and manipulating module 175 can comprise a first suction cup 200, for example a first set of suction cups 200, a second suction cup 205, for example a second set of suction cups 205, and a mechanism configured to move the second suction cup with respect to the first suction cup in at least one position to start opening the die-cut, in which the second suction cup faces the first suction cup and a die-cut 5 is retained at a first face thereof by the first suction cup and at a second face opposite to the first one by the second suction cup. Said first and second face are faces of the rectangular sections of the die-cut when the latter is in the closed die-cut condition.

Each suction cup 200,205 comprises a concave portion adapted to contact the items directly.

In the position to start the opening the die-cuts, the concavity of the second cup is turned towards the concavity of the first suction cup.

For further detail, the concave portion, which can for example be of a hemispherical or conical shape, of each suction cup develops around a central axis S, i.e. an axis of symmetry, and when one is in the position to start opening the die-cut the central axis of the concave portion of the first suction cup and the central axis of the concave portion of the second suction cup are substantially parallel to each other.

The suction cups of the first set of suction cups have central axes parallel to each other and the suction cups of the second set of suction cups have central axes parallel to each other. Furthermore, each concave portion of each suction cup comprises an external edge which comes in full contact with the items to be seized, and these external edges of each set of suction cups lie on the same plane distinct from a plane of the external edges of the other set of suction cups.

The module can also comprise a pneumatic circuit (not illustrated) connected to each suction cup and configured to generate a vacuum in each of them, i.e. configured to generate a vacuum inside the concave portion of each suction cup 200,205.

The gripping and manipulating module is also configured to move the suction cups to a seizing position, in which the second suction cup, that is the second set of suction cups, does not obstruct the field of action of the first suction cup. In particular, in this position the central axis of the second suction cup is inclined with respect to the central axis of the first suction cup and the concavity of the second suction cup is substantially turned in the same direction as the concavity of the first suction cup. Furthermore, in this position, an imaginary projection of the first suction cup parallel to the central axis and turned in the direction in which the concavity of the first suction cup is turned does not intersect any component of the module. In other words, in this position, an imaginary plane containing the edge of the first suction cup intersects an imaginary plane containing the edge of the second suction cup forming an obtuse angle turned towards the die-cut when this is seized by the first suction cup.

In the position of opening of the die-cuts, on the other hand, this projection intersects the second suction cup, i.e. at least one suction cup of the second set of suction cups.

The gripping and manipulating module is further configured to move the suction cups in a position to end the opening of the die-cut, in which the central axis of the second suction cup is perpendicular to the central axis of the first suction cup and the concavity of the second suction cup is substantially turned towards the first suction cup.

It is not excluded that in an alternative embodiment not illustrated, the gripping and manipulating module may comprise only the first suction cup, i.e. the first set of suction cups, integral in rotation with the wrist of the robotic arm, or that the mechanism configured to move the second suction cup with respect to the first suction cup, may comprise a first plate with which the first suction cup is integral, a second plate hinged to the first plate, and an actuator configured to put the second plate in rotation with respect to the first plate around the hinge axis.

However, in order to obtain a particularly compact gripping and manipulating module, centred with respect to the die-cut, and capable of carrying out a so-called positive opening of the die-cut, it is preferable to use the suction cup movement mechanism described below.

It should be noted that positive opening of a die-cut refers to a manipulation for opening the die-cut in which two out of the four rectangular sections of the die-cut are gripped when the die-cut is like in the closed die-cut configuration and are pulled in the direction of mutual distancing. On the contrary, a negative opening of the die-cut would be obtained if, while retaining one of the rectangular sections with a set of suction cups, the rectangular section adjacent to the one gripped by the first set of suction cups is seized with the other set of suction cups and the adjacent rectangular section is pushed to put it in rotation with respect to the folding line present between the two sections.

This second possibility is less preferable as pushing the die-cut can result in a greater number of rejects, for example because during the push a rectangular section of the die-cut could fold on itself.

In the embodiment illustrated, the mechanism that moves the second suction cup with respect to the first suction cup comprises a support frame to which the first suction cup 200, i.e. the first set of suction cups, is associated, for example without residual degrees of freedom, and which in turn is fixed, for example without residual degrees of freedom, to the last rigid element 195 of the kinematic chain of the robotic arm 180.

For example, the support frame comprises a pair of flat plates 210 parallel to each other and both fixed to the last rigid element of the kinematic chain of the robot arm.

The mechanism comprises a first rigid element 215, for example shaped like a rectilinear bar, hinged (directly) to the support frame 210 with respect to a first hinge axis X1.

This hinge axis X1 is for example parallel to a plane perpendicular to the central axes of all the suction cups of the first set.

The mechanism also comprises a second rigid element 220, for example also shaped like a rectilinear bar, hinged (directly) to the support frame 210 with respect to a second hinge axis X2 parallel and eccentric with respect to the first hinge axis X1.

In detail, a first pin coaxial to the hinge axis X1 and a second pin coaxial to the hinge axis X2 extend between the two parallel flat plates of the support frame and the first rigid element and the second rigid element each have a through hole which makes a rotoidal coupling with the respective pin.

The mechanism is provided with a third rigid element 225, for example shaped like a rectilinear bar, which is hinged (directly) both to the first rigid element 215 and to the second rigid element 220 respectively with respect to a third hinge axis X3 parallel and eccentric to the first hinge axis X1 and to the second hinge axis X2, and to a fourth hinge axis X4 parallel and eccentric to the first hinge axis X1, to the second hinge axis X2 and to the third hinge axis X3.

In detail, the distance between the first hinge axis and the third hinge axis is equal to the distance between the second hinge axis and the fourth hinge axis. Furthermore, the distance between the first and the second hinge axis is equal to the distance between the third and fourth hinge axis.

In the illustrated embodiment there are two third rigid elements parallel to each other and between which the first and second rigid element are partially interposed.

The mechanism then comprises a fourth rigid element 230, for example shaped like a bar, which is hinged (directly) to the first rigid element 215 with respect to a fifth hinge axis X5 parallel and eccentric to the first hinge axis X1, to the second hinge axis X2, to the third hinge axis X3 and to the fourth hinge axis X4. The fourth rigid element 230 is also hinged (directly) to the second rigid element 220 with respect to a sixth hinge axis X6, which is parallel and eccentric to the first hinge axis X1, to the second hinge axis X2, to the third hinge axis X3, to the fourth hinge axis X4 and to the fifth hinge axis X5.

The fifth hinge axis is at a greater distance from the first hinge axis than the distance of the fifth hinge axis from the third hinge axis, and the sixth hinge axis is at a greater distance from the second hinge axis than the distance of the sixth hinge axis from the fourth hinge axis.

Furthermore, the distance between the first hinge axis and the fifth hinge axis is equal to the distance between the second hinge axis and the sixth hinge axis. Furthermore, the distance between the first and the second hinge axis is equal to the distance between the fifth and sixth hinge axis.

In the illustrated embodiment there are two fourth rigid elements parallel to each other and between which the first and second rigid elements are partially interposed.

The mechanism comprises a fifth rigid element 235 to which the second suction cup 205, i.e. the second set of suction cups, is fixed, for example without residual degrees of freedom, and which is hinged (directly) to the third rigid element 225 with respect to a seventh hinge axis X7, parallel and eccentric to the first hinge axis X1, to the second hinge axis X2, to the third hinge axis X3, to the fourth hinge axis X4, to the fifth hinge axis X5 and to the sixth hinge axis X6.

The fifth rigid element 235 is also hinged (directly) to the fourth rigid element 230 with respect to an eighth hinge axis X8, which is parallel and eccentric to the first hinge axis X1, to the second hinge axis X2, to the third hinge axis X3, to the fourth hinge axis X4, to the fifth hinge axis X5, to the sixth hinge axis X6 and to the seventh hinge axis X7.

The seventh hinge axis is located at a greater distance from the third hinge axis than the distance of the seventh hinge axis to the fourth hinge axis, and the eighth hinge axis is located at a greater distance from the fifth hinge axis than the distance of the eighth hinge axis to the sixth hinge axis.

The distance between the seventh and the eighth hinge axis is equal to the distance between the fourth and sixth hinge axis. Furthermore, the distance between the first and the second hinge axis is equal to the distance between the fifth and sixth hinge axis.

The central axis of the concave portion of the second suction cup 205, i.e. the central axes of the central portions of the second set of suction cups, lies on a plane orthogonal to any one of the hinge axes of the mechanism.

The mechanism comprises a first linear actuator which is provided with a first portion, which is hinged to the support frame 210 with respect to a hinge axis parallel and eccentric to the hinge axes X1 and X2, and a second portion which is movable with respect to the first portion along a first rectilinear axis of movement.

In the illustrated embodiment, this first linear actuator comprises a double-acting cylinder 240, for example pneumatic, in which the first portion comprises a casing 245 inside which a cylinder is made and in which the second portion comprises an assembly formed by a piston (not illustrated), slidably housed in the cylinder according to the first rectilinear axis of movement, and a stem 250 integral in movement with the piston and which protrudes externally from the casing.

The stem of the first linear actuator is movable between a first end-of-travel position, in which the extension of the stem outside the cylinder is minimal, and a second end-of-travel position, in which the extension of the stem outside the cylinder is maximum.

The mechanism then comprises a lever 255 hinged to the support frame 210 with respect to a hinge axis X9 parallel and eccentric to the hinge axes X1 and X2 and to the hinge of the first portion of the first linear actuator with respect to the support frame.

An axial end of the stem 250 is hinged to the lever 255 with respect to a hinge axis X12 parallel to the hinge axis X9.

In detail, the mechanism comprises two identical levers 255 placed between the plates of the support frame.

The mechanism also provides for a second linear actuator, which is provided with a first portion hinged to the lever 255 according to a hinge axis X11 parallel and eccentric to the hinge axis X9 and to the hinge axis X12. The hinge axis X11 is placed at a greater distance from the hinge axis X12 than its same distance from the hinge axis X9.

The second linear actuator also comprises a second portion which is movable with respect to the first one according to a second rectilinear axis of movement.

The stem of the second linear actuator is movable between a first end-of-travel position, in which the extension of the stem outside the cylinder is minimal, and a second end-of-travel position, in which the extension of the stem outside the cylinder is maximum.

Furthermore, at the second portion the first rigid element 215 is hinged (directly) according to a hinge axis X10 parallel and eccentric to the first hinge axis X1.

In detail, the hinge axis X10 is located at a greater distance from the third hinge axis X3 than the distance of the hinge axis X10 from the first hinge axis X1. In other words, the first hinge axis X1 is substantially located between the hinge axis X10 and the third hinge axis X3.

The hinge axes X10, X1, X3 and X5 are aligned along a straight line.

The hinge axes X2, X4 and X6 are also aligned along a straight line, which is parallel to the straight line along which the axes X10, X1, X3 and X5 are aligned.

The hinge axes X5, X6, X8 are aligned along a straight line, for example incident to the line along which the axes X10, X1, X3 and X5 are aligned.

The hinge axes X3, X4 and X7 are also aligned along a straight line, which is parallel to the line along which the axes X5, X6, X3 and X8 are aligned.

In the illustrated embodiment, the second linear actuator comprises a double-acting cylinder 260, for example pneumatic, in which the first portion comprises a casing 265 hinged to the lever according to the hinge axis X11 and inside which a cylinder 270 is made and in which the second portion comprises an assembly formed by a piston 275, slidably housed in the cylinder according to the second rectilinear axis of movement, and a stem 280 integral in movement with the piston and which protrudes externally from the casing. The first rigid element is hinged (directly) to this stem 280 according to the hinge axis X10.

When the die-cut gripping and manipulating module is in the die-cut seizing position, the stem 250 of the first linear actuator and the stem 280 of the second linear actuator are in the respective first end-of-travel position.

By actuating the stem 250 of the first linear actuator in the second end-of-travel position while keeping the stem 280 of the second linear actuator in the respective first end-of-travel position, the module moves to the position to end the opening of the die-cut.

By actuating the stem 280 of the second linear actuator in the second end-of-travel position while keeping the stem 250 of the first linear actuator in the respective second end-of-travel position, the module moves to the die-cut start-to-open position, in which the die-cut is substantially clamped like in a vice between the first suction cup and the second suction cup.

In particular, in the passage from the seizing configuration to the die-cut start-to-open configuration, the second suction cup 205 substantially rotates with respect to the first suction cup 200 approaching it until the central axes S of the suction cups are parallel to each other.

In the passage from the die-cut start-to-open configuration to the die-cut end-to-open configuration, the second suction cup substantially rotates with respect to the first suction cup away from it until the central axes S of the suction cups are perpendicular to each other.

The apparatus comprising a machine for inserting items into the open die-cuts and for closing the open die-cuts 300, which is provided with an open die-cuts transport arrangement, configured to move the die-cuts substantially horizontally along a movement direction C through a plurality of stations of the machine, and in which the robotic arm is configured to position, i.e. place the open die-cuts directly on the transport arrangement of the machine for closing the open die-cuts.

This movement direction C, for example rectilinear and horizontal, is parallel to the movement direction A.

The transport arrangement in the illustrated embodiment comprises four parallel chains which define a rest surface for the open die-cuts, and the robotic arm is configured to position the open die-cuts directly on this rest surface.

Said chains comprise a plurality of abutment elements 310, adapted to retain each open die-cut at the front and at the rear so as to prevent the die-cut from returning by gravity to the closed die-cut condition during the movement and to push the filled open die-cut through the closing machine.

The transport arrangement can also comprise a roller conveyor of idle rollers on which the open die-cuts can rest at the bottom. This roller conveyor therefore serves as an aid to the four chains.

The robotic arm and the gripping and manipulating module are configured and commanded so as to place the open die-cut directly on the four chains when they are stationary. However, it is not excluded that in an embodiment not illustrated, in which the cartoning apparatus is not of the intermittent type, the robotic arm can be configured to release the open die-cut while the abutment elements are in motion, i.e. in synchronism with said abutment elements.

The abutment elements 310, which substantially rise vertically from the rest plane defined by the four chains, are positioned at predetermined distances from each other (at a fixed pitch) in such a way as to retain each open die-cut both at the front and at the rear with respect to the movement direction C, so as to prevent the die-cut from returning by gravity to the closed die-cut condition during movement and to transport it once it is filled.

The abutment elements are moved by flexible connection members which are actuated in synchrony with each other (each pair of chains, for example the one relative to the rear tines is moved by an independent motor) to advance the open die-cuts along the movement direction C. For example, a pair of chains for the rear abutment elements which push the die-cuts, and a pair of chains for the front abutment elements, which retain the die-cuts pushed by the rear abutment elements.

The closing machine then comprises a pusher drive 315 configured to push a duster of items at a time (making them substantially slide on a rest plane on which the duster of items to be inserted is located) inside an open die-cut present on the belt conveyor, previously deposited on the conveyor belt by the robotic arm. This pusher drive therefore acts along a horizontal direction perpendicular to the movement direction A to push a duster of items into the open die-cut. In particular, it comprises a fixed element and a movable element, for example said movable element comprising a vertical flat face 320 lying on a vertical plane parallel to the movement direction A, in which the movable element is movable with respect to the fixed element along the horizontal direction perpendicular to the movement direction A between a first position, in which it is distal from the closing machine 300, and a second position, in which it is proximal to the closing machine 300. In passing from the first position to the second position, the movable element exerts a thrust on the duster of items by inserting them into an open die-cut.

Once the items have been inserted into the open die-cut, the movable element is returned to the first position.

The movable element, for example, is actuated by means of linear electric actuators.

The machine 300 also comprises horizontal guides 325 configured to prevent the cluster of items from opening under the thrust of the pusher drive.

The machine for inserting items into open die-cuts and for closing open die-cuts then comprises a series of stations, subsequent to the one in which the items are inserted into the die-cut, in which an adhesive is applied to the closing flaps of the die-cut and they are folded with respect to the respective folding lines so as to close the openings of the tubular body. These stations are not further described as they are known to the person skilled in the art.

The operation of the apparatus according to the invention is as follows.

The items at the inlet of the sorting machine 100 enter the channels, where thanks to the vertical walls 105 and the conveyor belts that move the items between the vertical walls, the unsorted set of incoming items is sorted into rows, and, by means of the pegs (not illustrated) into arrangements separated from each other by a predetermined distance. At the outlet from the first stretch of the sorting machine, the sets of items sorted into rows are moved close to one side of the sorting machine proximal to the die-cut magazine 5 by means of the vertical walls 120 and under the thrust of the rods 115.

The items are brought to an area close to the pusher drive 315, for example by means of a conveyor belt past the vertical walls 120 and provided with an intermittent advancement motion, which pusher drive 315 pushes them into an open die-cut, present on the four chains of the machine for inserting items into the open die-cuts and for closing the open die-cuts, which is aligned with the direction along which the pusher drive acts to push the cluster of items.

After the insertion of the items, the open die-cut is moved to the subsequent stations where it is closed by gluing the closing edges.

Alongside these operations there is the one performed by the die-cut magazine 5 and by the die-cut pick-up and manipulating machine 170.

In particular, an operator loads the die-cuts onto the conveyor belt of the die-cut magazine substantially by taking a stack of die-cuts and arranging it horizontally so that the first die-cut of the stack contacts the abutment elements of the aperture and the other die-cuts are in contact between them.

The die-cut movement arrangement constantly generates a force on the die-cuts so as to move them towards the pick-up area and in such a way as to maintain a first die-cut in contact with the abutment elements of the aperture, as the die-cuts are picked up.

The presence of the brushes in the magazine prevents the die-cuts from sliding backwards on the support surface.

Once the die-cuts have been loaded and are in position, the robotic arm 180, with the gripping and manipulating module in the seizing position, moves said module so as to push the first set of suction cups against the first die-cut present in the pick-up area. By actuating the pneumatic system which generates a vacuum in the suction cups, the die-cut is now firmly gripped by the module and the robotic arm can pull the die-cut through the outlet opening 145 to pick it up from the magazine.

When the die-cut is outside the magazine, the gripping and manipulating module is actuated by the die-cut start-to-open position, for example by actuating both pneumatic cylinders of the linear actuators bringing the respective stems into the second end-of-travel position.

In this way the first rigid element 215 is put in rotation with respect to the hinge axis X1 and consequently the other rigid elements of the mechanism also rotate with respect to the corresponding hinge axes.

Thanks to the rotations of the rigid elements, the second set of suction cups is brought into contact with an opposite face of the die-cut (and turned in the opposite direction) with respect to a face that is in contact with the first set of suction cups, and the die-cut is thus clamped like in a vice between the two sets of suction cups.

Subsequently, by actuating the pneumatic system which generates a vacuum in the second set of suction cups, the face contacted by the second set of suction cups is firmly seized by them.

Thereafter, the module is brought from the die-cut start-to-open position to the die-cut end-to-open position. To carry out this manoeuvre, the pneumatic cylinder of the first linear actuator is kept with the stem in the second end-of-travel position, while the pneumatic cylinder of the second linear actuator is operated to bring the respective stem into the first end-of-travel position. During this actuation, again thanks to the rotations of the rigid elements, the second set of suction cups, moving away from the first set of suction cups, pulls the die-cut, opening it.

By keeping the module in this last position reached, the robotic arm brings the open die-cut onto the conveyor of the machine for inserting items into the open die-cuts and for closing the open die-cuts. When the open die-cut is placed, for example on the four chains, the generation of the vacuum in the suction cups is interrupted in order to release the die-cut, which can thus continue its movement along the machine for inserting the dusters of items into the die-cuts and for closing the die-cuts.

The invention thus conceived is susceptible to several modifications and variations, all falling within the scope of the inventive concept.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A cartoning apparatus of items comprising:

a die-cut magazine, in which a plurality of die-cuts is stored for packaging the items, a die-cut pick-up and manipulating machine, configured to pick up the die-cuts from the die-cut magazine and manipulate the die-cuts so as to open each die-cut, wherein the die-cut pick-up and manipulating machine comprises a robotic aim on which a die-cut gripping and manipulating module is installed, configured to grip one die-cut at a time directly from the pick-up area of the die-cut magazine and manipulate the one die-cut in order to open the one die-cut, wherein the gripping and manipulating module comprises a first suction cup, a second suction cup, and an articulated mechanism configured to move the second suction cup with respect to the first suction cup in at least one position in which the second suction cup faces the first suction cup and the die-cut is retained at a first face thereof by the first suction cup and, at a second face opposite to the first, by the second suction cup, wherein the articulated mechanism comprises:

a support frame, to which the first suction cup is associated, a first rigid element, hinged to the support frame with respect to a first hinge axis, a second rigid element, hinged to the support frame with respect to a second hinge axis parallel and eccentric with respect to the first hinge axis, a third rigid element, hinged to the first rigid element with respect to a third hinge axis parallel and eccentric to the first hinge axis and to the second hinge axis, and hinged to the second rigid element with respect to a fourth hinge axis parallel and eccentric to the first hinge axis, to the second hinge axis and to the third hinge axis, a fourth rigid element, which is hinged to the first rigid element with respect to a fifth hinge axis parallel and eccentric to the first hinge axis, to the second hinge axis, to the third hinge axis and to the fourth hinge axis, and which is hinged also to the second rigid element, with respect to a sixth hinge axis parallel and eccentric to all the other hinge axes of the mechanism, a fifth rigid element, hinged to the third rigid element and to the fourth rigid element respectively with respect to a seventh hinge axis and an eighth hinge axis, which are parallel and eccentric with respect to all the other hinge axes of the articulated mechanism, wherein the second suction cup is fixed to the fifth rigid element.

2. The cartoning apparatus according to claim 1, wherein the robotic arm comprises a fixed base and a kinematic chain provided with a plurality of rigid members connected by means of joints, of which a first rigid member of the kinematic chain, which is fixed to the base, and a last rigid member to which the gripping and manipulating module is connected.

3. The cartoning apparatus according to claim 1, wherein the robotic arm is of the six-axis type.

* * * * *